(12) United States Patent
Sawada et al.

(10) Patent No.: US 7,410,190 B2
(45) Date of Patent: Aug. 12, 2008

(54) MOTOR-DRIVEN POSITION ADJUSTMENT APPARATUS FOR STEERING WHEEL

(75) Inventors: Naoki Sawada, Gunma (JP); Masato Iwakawa, Gunma (JP); Akihiro Shoda, Gunma (JP); Takeshi Fujiwara, Gunma (JP)

(73) Assignee: NSK Ltd., Tokyo (JP)

( * ) Notice: Subject to any disclaimer, the term of this patent is extended or adjusted under 35 U.S.C. 154(b) by 1 day.

(21) Appl. No.: 11/363,295

(22) Filed: Feb. 17, 2006

(65) Prior Publication Data

US 2006/0191368 A1    Aug. 31, 2006

(30) Foreign Application Priority Data

| Feb. 17, 2005 | (JP) | ............................. 2005-039924 |
| Apr. 25, 2005 | (JP) | ............................. 2005-126834 |
| Jun. 20, 2005 | (JP) | ............................. 2005-179321 |
| Jul. 14, 2005 | (JP) | ............................. 2005-205553 |

(51) Int. Cl.
     *B62D 1/00*    (2006.01)
(52) U.S. Cl. .................. 280/777; 280/775; 280/779; 180/427; 74/492; 74/493
(58) Field of Classification Search .............. 280/775, 280/777, 779; 74/492, 493; 180/400, 427, 180/428, 434, 444
     See application file for complete search history.

(56) References Cited

U.S. PATENT DOCUMENTS

| 4,602,520 | A | * | 7/1986 | Nishikawa et al. ............ 74/493 |
| 4,691,587 | A | * | 9/1987 | Farrand et al. ................ 74/493 |
| 4,785,684 | A | * | 11/1988 | Nishikawa et al. ............ 74/493 |
| 4,901,593 | A | * | 2/1990 | Ishikawa ...................... 74/493 |
| 5,178,411 | A | * | 1/1993 | Fevre et al. ................. 280/775 |
| 5,265,906 | A | * | 11/1993 | Faulstroh .................... 280/775 |
| 5,690,362 | A | | 11/1997 | Peitsmeier et al. .......... 280/775 |
| 5,806,890 | A | * | 9/1998 | Sugiki et al. ................ 280/775 |
| 5,911,789 | A | * | 6/1999 | Keipert et al. ................ 74/493 |
| 6,224,104 | B1 | | 5/2001 | Hibino ....................... 280/777 |
| 6,264,239 | B1 | | 7/2001 | Link ........................... 280/777 |
| 2002/0124677 | A1 | | 9/2002 | Tomaru et al. ................ 74/493 |
| 2003/0160440 | A1 | | 8/2003 | Kahlenberg et al. ......... 280/775 |

FOREIGN PATENT DOCUMENTS

| JP | 11-165643 | 6/1999 |
| JP | 2000-233758 | 8/2000 |
| JP | 2003-276616 | 2/2003 |
| WO | WO 03/074234 | 9/2003 |
| WO | WO 2004/056637 | 7/2004 |

* cited by examiner

Primary Examiner—Toan C To
(74) Attorney, Agent, or Firm—Miles & Stockbridge P.C.

(57) ABSTRACT

In a motor-driven steering wheel position adjustment apparatus, a nut 17 being a driven member is mounted such that it can be detached from an inner column of a steering column, based on a shock load applied at the time of a secondary collision, and therefore a threaded rod of a feed screw mechanism does not have resistance with respect to displacement of the inner column in the forward direction at that time. Improvement in the protection of a driver at the time of a collision can thus be achieved, and, since an integrated member can be used for the threaded rod, silence during the position adjustment of a steering wheel by the feed screw mechanism can be ensured.

8 Claims, 33 Drawing Sheets

MOTOR-DRIVEN POSITION ADJUSTMENT APPARATUS FOR STEERING WHEEL

TECHNICAL FIELD

This invention relates to improvements to a motor-driven steering wheel position adjustment apparatus which adjusts the position (either one or both of the fore-aft position and the up-down position) of a steering wheel using an electric motor as its power source. To be specific, it realizes a structure that can ensure silence during position adjustment, and that can achieve an improvement in the protection of a driver at the time of a collision accident.

BACKGROUND ART

A position adjustment apparatus of a steering wheel, such as a fore-aft position adjustment apparatus called a telescopic steering apparatus, or an up-down position adjustment apparatus called a tilt-type steering apparatus, is widely used as an apparatus for adjusting the position of a steering wheel according to the physical dimensions and posture of a driver. Furthermore, conventionally, a motor-driven position adjustment apparatus for a steering wheel is also widely used, in which the position is adjusted by an electric motor based on a switching operation. For example, FIG. 35 shows a motor-driven fore-aft position adjustment apparatus for a steering wheel, which is disclosed in Patent Document 1.

In the case of this conventional structure, a steering column 1 is a so-called telescopic steering column whose overall length can be extended and contracted freely by inserting the front part of an inner column 3 provided toward the rear (right side in FIG. 35) into an outer column 2 provided toward the front (left side in FIG. 35). The rear end part (right end in FIG. 35) of a driving rod (push-pull rod, threaded rod) 5 is joined and fixed to a joining plate 4 fixed toward the rear end part of the inner column 3. Moreover, a male thread 6 provided on the front end part (left half of FIG. 35) of the driving rod 5 is screwed into a nut which is provided inside a housing 7 fixed on the outer peripheral surface of the outer column 2, such that it can only rotate freely, and which is rotated in a desired direction by an electric motor, to thereby form a feed screw mechanism. When adjusting the fore-aft position of a steering wheel 8, the inner column 3 is pushed or pulled in the axial direction (left/right direction in FIG. 35) by the feed screw mechanism to extend and contract the steering column 1. A steering shaft 9, on the rear end part of which is fixed the steering wheel 8, is supported inside of the inner column 3 such that it can only rotate freely, and can be extended and contracted freely by a spline engagement part. Accordingly, the fore-aft position of the steering wheel 8 can be adjusted as the steering column 1 is extended and contracted.

The construction and operation of a motor-driven steering wheel fore-aft position adjustment apparatus is as described above. However, in order to protect a driver at the time of a collision accident, regardless of the existence of the above-described driving rod 5, a structure is required whereby the steering wheel 8 can be displaced forward. That is, at the time of a collision accident, following a so-called first collision where a vehicle collides with another vehicle or the like, a so-called secondary collision occurs where the driver's body (mainly chest or head) collides with the steering wheel 8. In order to relieve the impact on the driver's body at the time of this secondary collision, a construction is required in which the steering wheel 8 is displaced forward simultaneously with the secondary collision.

In the case of the construction shown in FIG. 35, since the steering column 1 and the steering shaft 9 are constructed such that they can both be extended and contracted freely, it is possible to form a structure directly in which the steering wheel 8 is displaced forward simultaneously with the secondary collision. However, since the driving rod 5 does not contract by its full length as it stands, but creates an impediment between the outer column 2 and the inner column 3 constituting the steering column 1, the steering column 1 does not contract. Needless to say, since the outer column 2 is supported relative to the vehicle such that it falls away forward simultaneously with the secondary collision due to the structure disclosed in Patent Documents 2 and 3 for example, even if there is a driving rod 5 as described above, it does not mean that there is no displacement of the steering wheel 8 forward at all. However, to the degree that the steering column 1 does not contract, not only does the peak of the shock load tend to occur at the initial stage of the secondary collision, but also the amount of forward displacement of the steering wheel 8 is reduced, and hence it is a disadvantage from the aspect of satisfactory protection of the driver.

Therefore, the abovementioned Patent Document 1 describes an invention related to a driving rod 5a that contracts by its full length based on a shock load applied during a secondary collision, using a structure as shown in FIG. 36 for example. The driving rod 5a comprises a cylindrical outer casing 10, and an internal shaft 11 joined by a pin 12 formed from a synthetic resin or a soft metal. The driving rod 5a as described above contracts by its full length as the pin 12 is broken by the shock load applied during the secondary collision. Accordingly, the driving rod 5a does not create an impediment between the outer column 2 and the inner column 3, and hence the steering column 1 is allowed to contract during the secondary collision.

However, it is difficult to ensure the concentricity of the driving rod 5a comprising the outer casing 10 and the internal shaft 11, over its full length. That is, the part toward one end and the part toward the other end of the driving rod 5a tend to be out of alignment. If it becomes eccentric, a non-uniform force acts on the part where the male thread 6 of the driving rod 5a and the nut screw together, and when rotating the driving rod 5a in order to adjust the fore-aft position of the steering wheel 8, annoying grinding noises, and uncomfortable vibrations are likely to occur.

Furthermore, it can also be considered that forming a nut, which constitutes a feed screw mechanism with a driving rod, from a synthetic resin, and breaking the female thread of the nut during the secondary collision, enables the displacement in the axial direction of the driving rod with respect to the nut, enabling the steering column to contract. However, in the case where such a structure is used, it is difficult to design to ensure the reliability (difficulty of breaking) of the threaded part of the male thread of the driving rod and the nut, and also to break the female thread reliably during the secondary collision.

[Patent Document 1] Japanese Patent Application Publication No. 2003-276616

[Patent Document 2] Japanese Patent Application Publication No. Hei 11-165643

[Patent Document 3] Japanese Patent Application Publication No. 2000-233758

DISCLOSURE OF THE INVENTION

Problem to be Solved by the Invention

The present invention takes the above-described situations into consideration, with an object of realizing a motor-driven position adjustment apparatus for a steering wheel that can ensure silence during position adjustment, and that can achieve an improvement in the protection of a driver at the time of a collision accident.

Means of Solving the Problem

Of motor-driven position adjustment apparatuses for a steering wheel of the present invention, a motor-driven position adjustment apparatus for a steering wheel according to a first aspect comprises: a steering column; a driven member; a driving member; and an electric motor, similarly to a conventionally known motor-driven position adjustment apparatus for a steering wheel.

The steering column has a steering shaft rotatably supported inside.

Furthermore, the driven member is supported on a part of the steering column.

Moreover, the driving member is engaged with the driven member, and displaces the driven member as it rotates.

Furthermore, the electric motor is for rotating and driving the driving member.

The construction is such that the steering column is displaced based on a relative displacement of the driving member and the driven member based on a current supplied to the electric motor, so that a position of a steering wheel supported on an end of the steering shaft is adjusted.

Especially, in the motor-driven position adjustment apparatus for a steering wheel according to the first aspect, at least either one of the members of the driven member and the electric motor (similarly for the driving member) is mounted such that it can be detached from the steering column based on a shock load applied at the time of a collision.

Moreover, of the motor-driven position adjustment apparatuses for a steering wheel of the present invention, a motor-driven position adjustment apparatus for a steering wheel according to a second aspect comprises: a steering column; a driven member; a push-pull rod; a driving member; and an electric motor, similarly to a conventionally known motor-driven position adjustment apparatus for a steering wheel.

The steering column has a steering shaft rotatably supported inside.

Furthermore, the driven member is joined to a part of the steering column.

Moreover, the push-pull rod is arranged in the axial direction of the steering column in a state where one end is joined to the driven member.

Furthermore, the driving member is rotatably supported on the periphery of a part toward the other end of the push-pull rod, and displaces the push-pull rod in the axial direction of the steering column as it rotates.

Moreover, the electric motor is for rotating and driving the driving member.

The construction is such that the steering column is displaced based on a relative displacement of the driving member and the push-pull rod based on a current supplied to the electric motor, so that a position of a steering wheel supported on an end of the steering shaft is adjusted.

Especially, in the motor-driven position adjustment apparatus for a steering wheel according to the second aspect, at least either one of a joined part between the push-pull rod and the driven member, and a joined part between the driven member and the steering column, can be separated based on a shock load applied at the time of a collision.

EFFECTS OF THE INVENTION

In the case of a motor-driven position adjustment apparatus for a steering wheel of the present invention constructed as described above, even if the driving member is not a two-piece construction (even if it is a one-piece construction), it can allow the steering column to be displaced by a shock load applied at the time of a collision. Therefore, it is possible to ensure silence during position adjustment, and also achieve an improvement in the protection of a driver at the time of a collision.

BEST MODE FOR CARRYING OUT THE INVENTION

Figure 1:
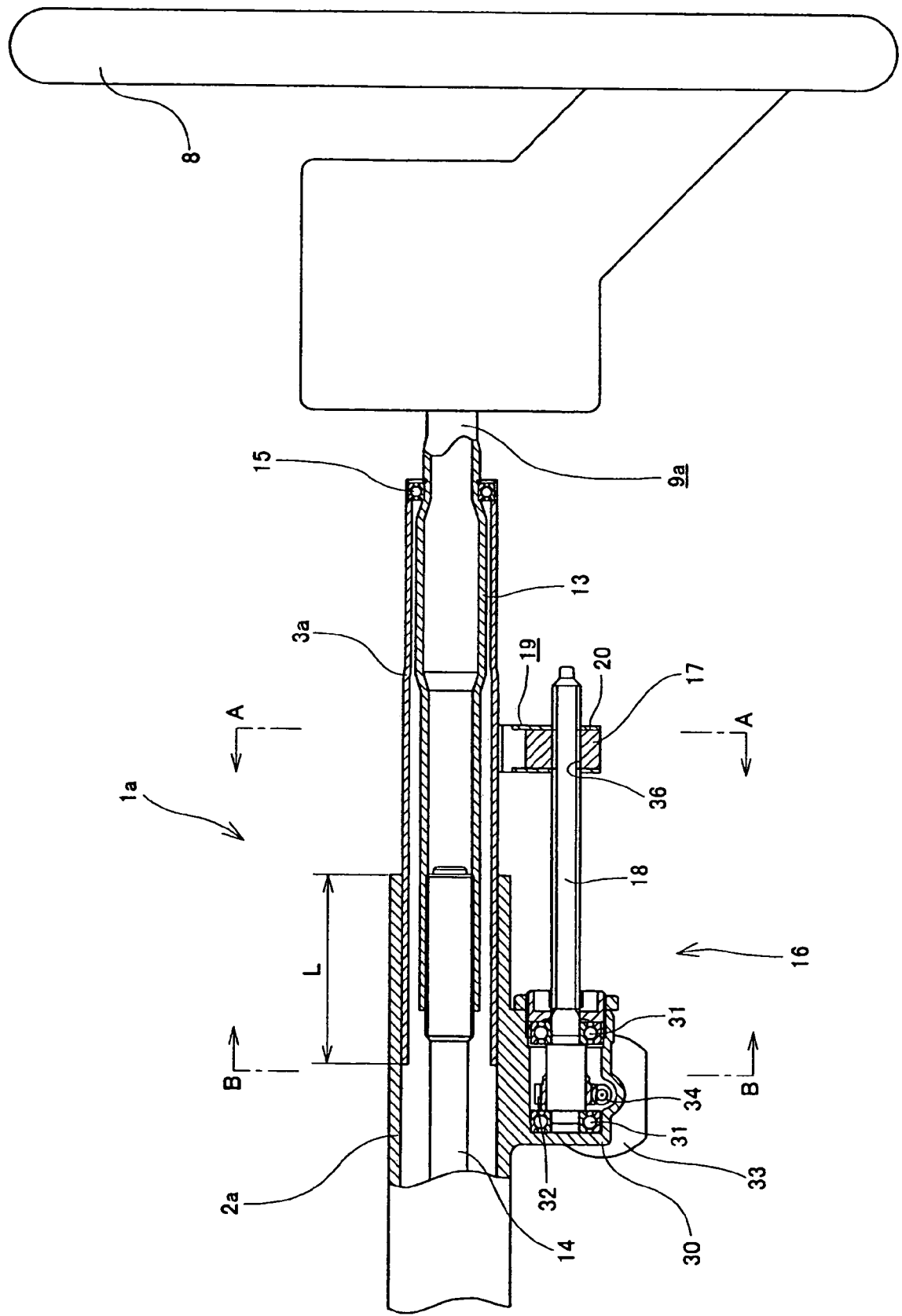
FIG. 1 is a vertical sectional side elevation showing the main parts of example 1 of the present invention in a normal state.
Figure 2:
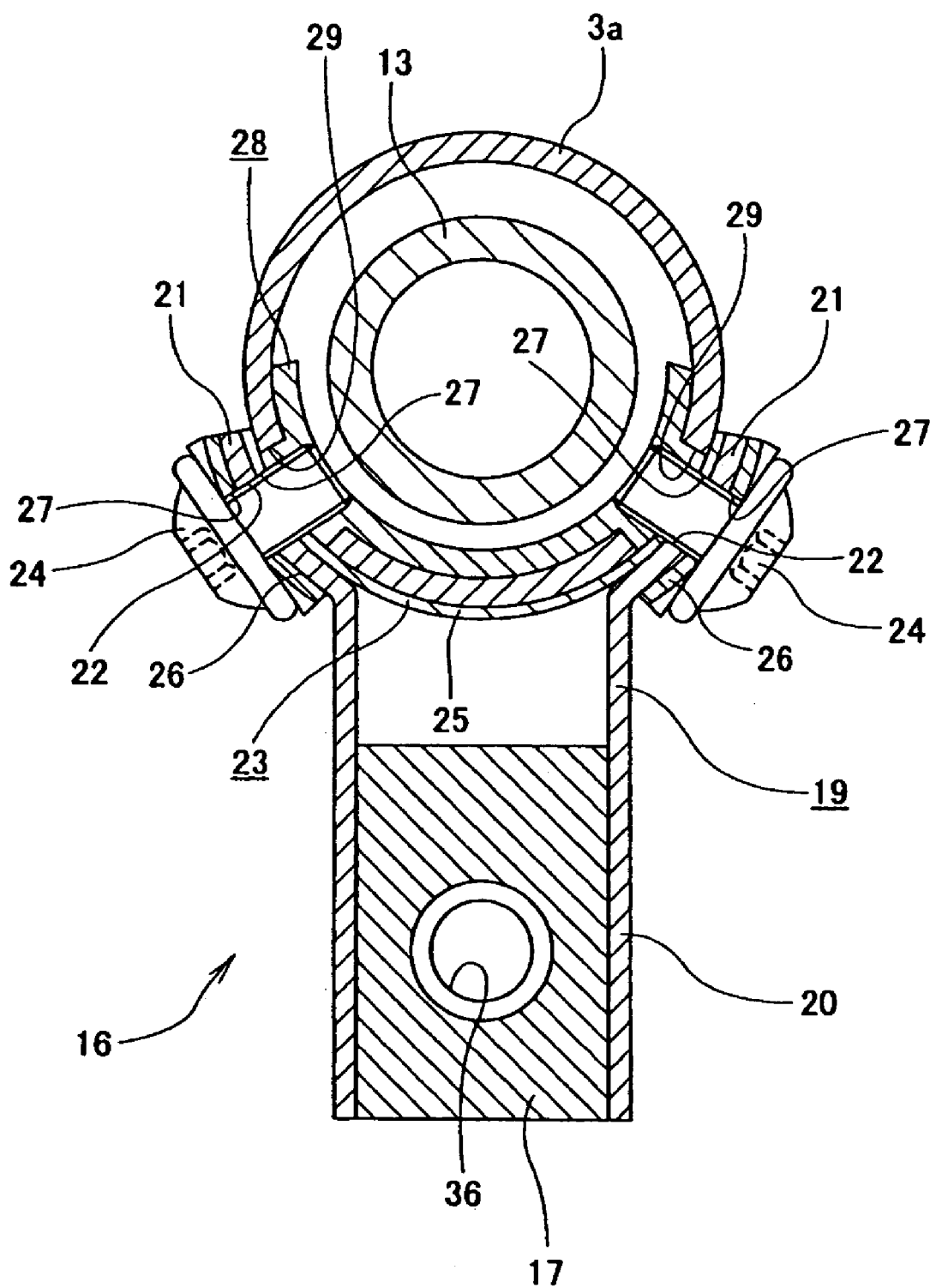
FIG. 2 is a cross-sectional diagram through A-A of FIG. 1.
Figure 3:
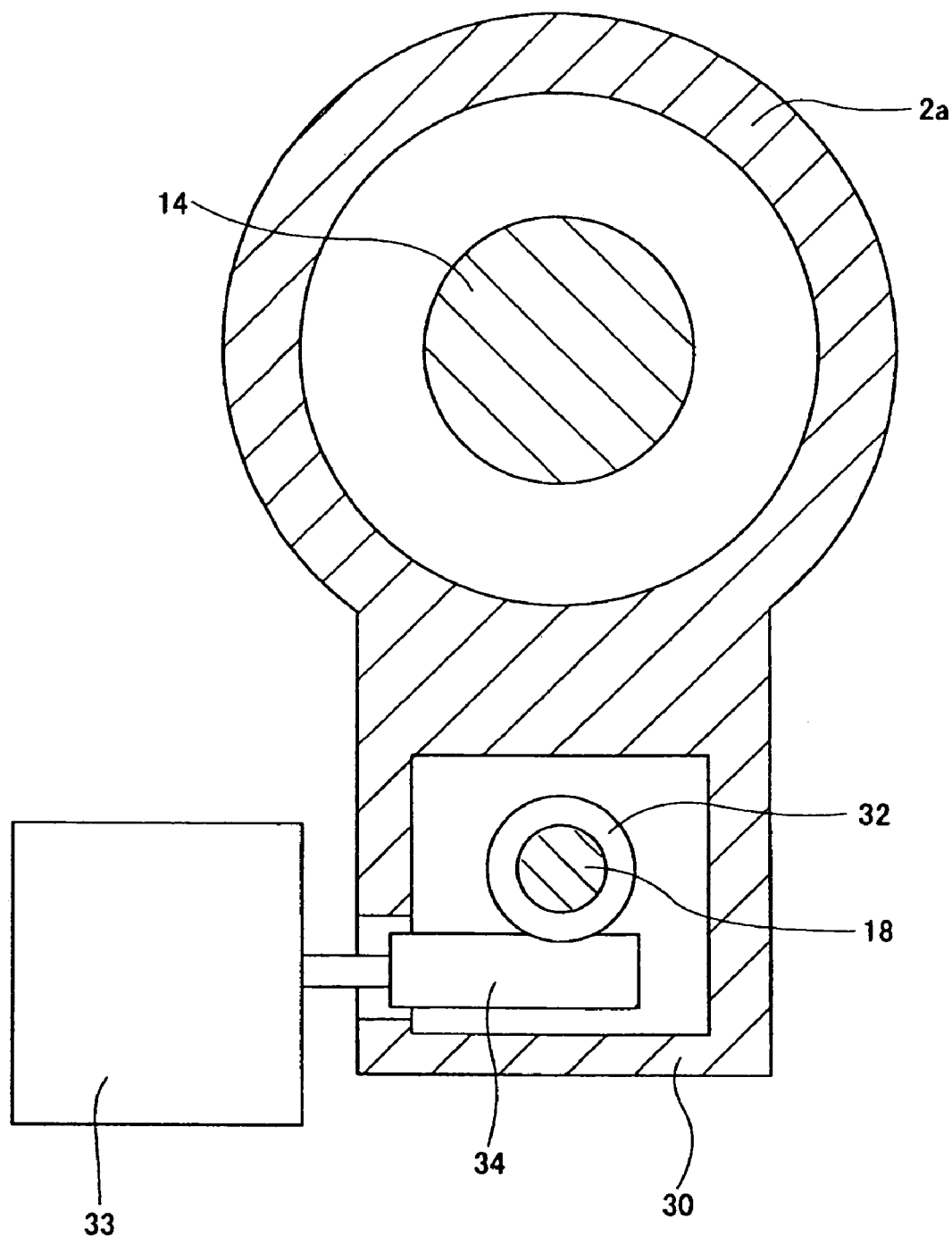
FIG. 3 is a cross-sectional diagram through B-B of FIG. 1.

In the case of implementing the first aspect of the present invention, it is preferred that at least either one of the members of the driven member and the electric motor (similarly for the driving member), which is detached from the steering column at the time of a collision, is retained by a joining bracket. Moreover, this Joining bracket is supported on the steering column by a joining member such as a screw, a rivet or the like inserted through a mounting hole formed in a flange part butted up against an outer peripheral surface of the steering column, and joined to the steering column. Furthermore, the mounting hole is are opened (formed in a notch shape) at one end of the flange part in a direction in which the joining member exits when the steering column is displaced due to a collision accident.

Using such a construction, it is possible to realize a structure in which at least either one of the driven member and the electric motor (similarly for the driving member) can be detached reliably from the steering column at the time of a collision accident.

In the case of implementing the invention as described above, preferably a low friction material (agent) is interposed between the flange part and an outer peripheral surface of the steering column.

For a low friction material (agent) to be used in this case, for example, a sliding plate, at least one surface of which is covered with a polytetrafluoroethylene resin (PTFE) or a solid lubricant, a sliding plate formed from a synthetic resin whose coefficient of friction is low, such as PTFE, a polyamide resin or the like, grease, or a self-lubricating metal plating such as Cu, Pb, Ag, or Au, or the like, can be used.

In this manner, it is possible to reduce the force required to uncouple the joining bracket from the steering column, reduce the force required to start the displacement of the steering column at the time of a collision accident, and achieve an improvement in the protection of the driver. Here, the magnitude of the force required for the detachment can also be controlled by the amount of clamping force of the screws used to couple the flange part with the steering column, in addition to the coefficient of friction of the low friction material (agent).

For another construction for implementing the first aspect of the present invention, for example, at least either one of the members of the driven member and the electric motor (similarly for the driving member), which is detached from the steering column at the time of a collision, is retained by a joining bracket. Moreover the joining bracket is supported on the outer periphery of the steering column via a joining member formed from a synthetic resin with a suitable strength such that it can be broken accompanying the impact of a collision accident.

Using such a construction, it is also possible to realize a structure in which at least either one of the driven member and the electric motor (similarly for the driving member) can be detached reliably from the steering column at the time of a collision accident.

Furthermore, in the case of implementing the first aspect of the present invention, preferably the steering column is an inner column of a telescopic steering column whose overall length can be extended and contracted by inserting a front portion of the inner column arranged toward the rear into a rear portion of the outer column arranged toward the front. Moreover, the driven member is a nut which is supported on part of the inner column, exposed from the outer column, and that has a threaded hole in a direction parallel to the axial direction of the steering column. Furthermore, the driving member is a threaded rod which is arranged parallel to the axial direction of the steering column, and a proximal end thereof is supported on part of the outer column such it can only be rotated freely, and a central part or a tip end thereof is screwed into the nut. Moreover a position of the steering wheel in relation to the axial direction of the steering column can be adjusted freely by rotating the threaded rod using an electric motor supported on part of the outer column.

Implementing the first aspect of the present invention using such a construction, it is possible to displace the inner column in the axial direction smoothly at the time of a collision accident, and contract it by the full length of the steering column, thus enabling effective protection of the driver.

In the case of implementing the invention as described above, for example, a sphere fixed to the nut may be fitted inside a cylinder part provided on a joining bracket mounted on the outer periphery of the inner column such that it can be detached based on a shock load applied at the time of a collision, such that it can be displaced in the axial direction of the cylinder part. In the case where such a construction is used, even if the relationship between the positions of the inner column and the threaded rod is not controlled exactly, it is possible to reliably transmit the movement of the nut screwed onto the threaded rod, to the inner column. Therefore, it is not necessary to control the form accuracy and the dimensional accuracy required for the components nor the assembling accuracy of each of the components exactly, which are advantages from the aspect of cost reduction.

Moreover, in the case of implementing the second aspect of the present invention, for example, it is preferred that a separable joined part is constructed by fitting a pair of members to be joined, via an elastic deformable spacer.

Alternatively, the separable joined part is constructed by fitting a pair of members to be joined, via a spacer having a high coefficient of friction.

Alternatively, the separable joined part is constructed by joining a pair of members to be joined, using a joining member that breaks based on a shock load.

In whichever construction is used, the joined part is detached based on the shock load applied at the time of a collision, thus enabling the steering column to be displaced forward.

Furthermore, in the case of implementing the invention as described above, preferably, a spacer may also be interposed between an outer peripheral surface of a push-pull rod, and an inner peripheral surface of a retainer sleeve arranged on the periphery of the push-pull rod. In this case, the retainer sleeve is joined to a driven member such that it can be displaced freely together with the driven member at the time of a collision accident.

By constructing in this manner, the operation of assembling the spacer on the periphery of the push-pull rod does not have to be performed in an automobile assembly plant, but can be performed in a component factory of a motor-driven position adjustment apparatus for a steering wheel. Therefore, the assembly operation in an automobile assembly plant can be simplified, and hence the aim of improving the efficiency of the assembly operation can be achieved.

Moreover, in the case of implementing the invention as described above, preferably an outer diameter of a part of the push-pull rod that is positioned on an inner diameter side of the spacer at a normal time, is made larger than an outer diameter of a part of the same that enters the inner diameter side of the spacer as a collision accident occurs.

By constructing in this manner, it is possible to adjust the energy absorption characteristics at the time of a secondary collision. That is, the push-pull rod is displaced in the axial direction with respect to the spacer while rubbing against it as the steering wheel is displaced forward at the time of a secondary collision. At this time, the impact energy applied to the steering wheel is absorbed by the friction force. If the outer diameter of the push-pull rod is varied, the stroke that displaces the steering wheel forward can be adjusted while absorbing the impact energy, and hence the degree of freedom of tuning to protect the driver improves.

In the case of implementing the invention as described above, more preferably two spacers whose inner diameters are different in a free state are provided at two positions in the axial direction on the periphery of the push-pull rod. Moreover at normal times, a part of the push-pull rod whose outer diameter is large is located inside of the spacer whose inner diameter is large in a free state, and a part of the same whose outer diameter is small is located inside of the spacer whose inner diameter is small in the same state.

By constructing in this manner, it is possible to adjust the energy absorption characteristics at the time of a secondary collision more finely. That is, since it is possible to adjust the energy absorption amount and stroke when the steering wheel is displaced forward while absorbing the impact energy in two stages, it further improves the degree of freedom of tuning to protect the driver.

EXAMPLE 1

FIGS. 1 to 5 show example 1 of the present invention. The present example shows the case in which the present invention is used in a telescopic steering apparatus for adjusting the fore-aft position of a steering wheel 8. The steering wheel 8 is supported and fixed on a part, being the rear end part of the steering shaft 9*a*, that protrudes backward from the rear end part (right end part in FIGS. 1 and 4) of the steering column 1*a*. The steering column 1*a* is a telescopic steering column whose overall length can be extended and contracted by inserting the front part of an inner column 3*a* provided toward the rear (right side in FIGS. 1 and 4) into the rear part of an outer column 2*a* provided toward the front (left side in FIGS. 1 and 4) such that they fit with each other without loose and they can slide to each other in the axial direction. Such a steering column 1*a* extends and contracts by its full length by changing an engagement length L of the outer column 2*a* and the inner column 3*a*. Of the outer column 2*a* and the inner column 3*a*, the outer column 2*a* is supported in the vehicle by brackets (typically, an upper and lower pair of a lower bracket and an upper bracket), which are not shown in the figures. Accordingly, the inner column 3*a* is displaced in the fore-aft direction based on the extension and contraction of the steering column 1*a*.

Furthermore, regarding the steering shaft 9*a*, the front end part of a cylindrical outer shaft 13 provided at its rear, and the rear end part of the inner shaft 14 provided at its front are connected using a spline. Accordingly, the two shafts 13 and 14 can transmit rotational force freely, and at the same time can extend and contract freely. A part toward the rear end of the central part of the outer shaft 13 constituting such a steering shaft 9*a* is supported on the inside of the rear end part of the inner column 3*a* by a rolling bearing 15 such as a single row deep groove bearing, such that it can only rotate freely (in a state in which displacement in the axial direction is prevented). Accordingly, the outer shaft 13 is displaced in the fore-aft direction together with the steering wheel 8 supported and fixed on the rear end part thereof, as the inner column 3*a* is displaced in the fore-aft direction.

In order to displace the inner column 3*a* in the fore-aft direction, an electric feed screw mechanism 16 is provided between the inner column 3*a* and the outer column 2*a*. Of a nut 17 and a threaded rod 18 constituting the feed screw mechanism 16, the nut 17 which is the driven member, is supported on the inner column 3*a*, and the threaded rod 18, which is the driving member, is supported on the outer column 2*a*.

The nut 17 thereof is of a rectangular shape with a threaded hole 36 in its center, and is retained and fixed in a square tubular bending part 20 provided in the lower half of a joining bracket 19 formed by bending a metal plate. A right and left pair of flange parts 21 is provided on the top of both sides of the holding part 20, which extend diagonally upward in opposite directions in relation to the width direction. Notch shaped mounting holes 22 are formed in both of the flange parts 21, which open at the front ends of the flange parts 21.

The joining bracket 19 as described above is supported on the part toward the bottom rear end of the inner column 3*a* via a sliding plate 23 and a pair of right and left screws 24. The sliding plate 23 thereof is formed from a metal plate such as a steel plate, a stainless steel plate, an aluminum alloy plate, or the like, and on at least one of its surfaces a membrane formed from a low friction material such as PTFE is formed. It comprises a base part 25, which is shaped in a curve along the bottom surface of the inner column 3a, and a pair of right and left return parts 26, which return by 180 degrees downward from the front end of both of the right and left side parts of the base part 25. The abovementioned membrane formed from a low friction material is located on at least the top surfaces of both of the return parts 26, and the bottom surfaces of both the right and left side parts of the base part 25. Furthermore, holes 27 for the two screws 24 to be inserted, are formed in the parts where the return parts 26 and the respective right and left side parts of the base part 25 coincide.

The joining bracket 19 is supported on the part toward the bottom rear end of the inner column 3a by the two screws 24, which are inserted through the holes 27 and the two mounting holes 22 in a state in which the two flange parts 21 are inserted between the two return parts 26, and both of the right and left side parts of the base part 25, which constitute the sliding plate 23. For this purpose, an arc shaped nut plate 28 is supported and fixed on the inside of the part toward the rear of the inner column 3a. In the example shown in the figure, burring processed parts of the nut plate 28, in which threaded holes are formed, are fitted in through holes 29 formed in parts of the inner column 3a, which coincide with the holes 27 and 22. The two screws 24 inserted into the holes 27 and the two mounting holes 22, support the joining bracket 19 on the central part of the bottom of the inner column 3a by being screwed and secured in the threaded holes of the nut plate 28.

On the other hand, the proximal end part (front end part, left end part in FIGS. 1 and 4) of the threaded rod 18 is supported in a housing part 30 provided at the part toward the bottom rear end of the outer column 2a such that it can only rotate freely (displacement in the axial direction with respect to the outer column 2a is prevented), by a pair of rolling bearings 31, such as deep groove type, or angular type, ball bearings. A worm wheel 32 is fixed at the part located between the two rolling bearings 31 at the proximal end part of the threaded rod 18. Furthermore, an electric motor 33 is supported and fixed on the outer face of the housing part 30, and a worm 34 fixed on the output shaft of the electric motor 33, and the worm wheel 32 are engaged. Using this construction, the threaded rod 18 can be rotated and driven freely in a desired direction based on the current supplied to the electric motor 33.

In the case of the present example constructed as described above, when moving the steering wheel 8 to a desired position at a normal time, current is supplied to the electric motor 33 by operating a switch, which is not shown in the figure, and the threaded rod 18 is rotated and driven in a desired direction by a desired amount. Moreover the nut 17 moves along the threaded rod 18, and the inner column 3a is pushed or pulled via the joining bracket 19 to displace the inner column 3a in the axial direction by a desired amount. As a result, the outer shaft 13, which is supported inside of the inner column 3a such that it can only rotate freely, is displaced in the axial direction by the desired amount with the inner column 3a, and the fore-aft position of the steering wheel 8, which is supported and fixed on the rear end part of the outer shaft 13, is adjusted as desired.

When a shock load, which is directed forward (left in FIGS. 1 and 4), is applied to the inner column 3a from the steering wheel 8 via the outer shaft 13 and the rolling bearing 15 by a secondary collision accompanying a collision accident, the inner column 3a is displaced forward. At this time, the outer column 2a remains in position. That is, there is a situation in which as the secondary collision progresses, the outer column 2a is also detached from the support part on the vehicle, and starts to be displaced forward. However, at least in the initial stage of the secondary collision, the outer column 2a remains in position, and only the inner column 3a is displaced forward while the engagement length L with the outer column 2a is increased from the state as shown in FIG. 1 to the state as shown in FIG. 4.

Figure 4:
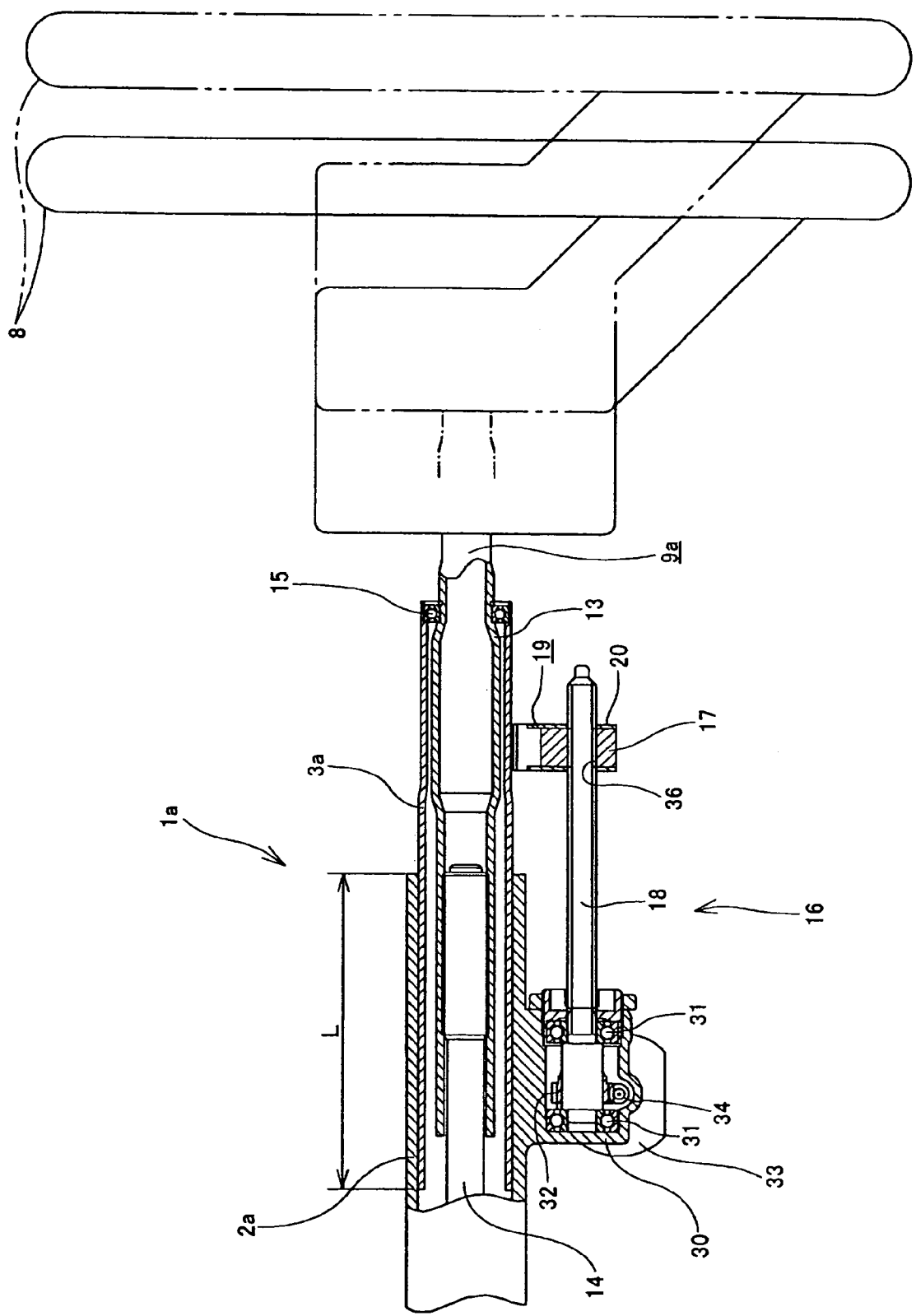
FIG. 4 is a vertical sectional side elevation showing the main parts of example 1 of the present invention in a state in which a secondary collision occurs.
Figure 5:
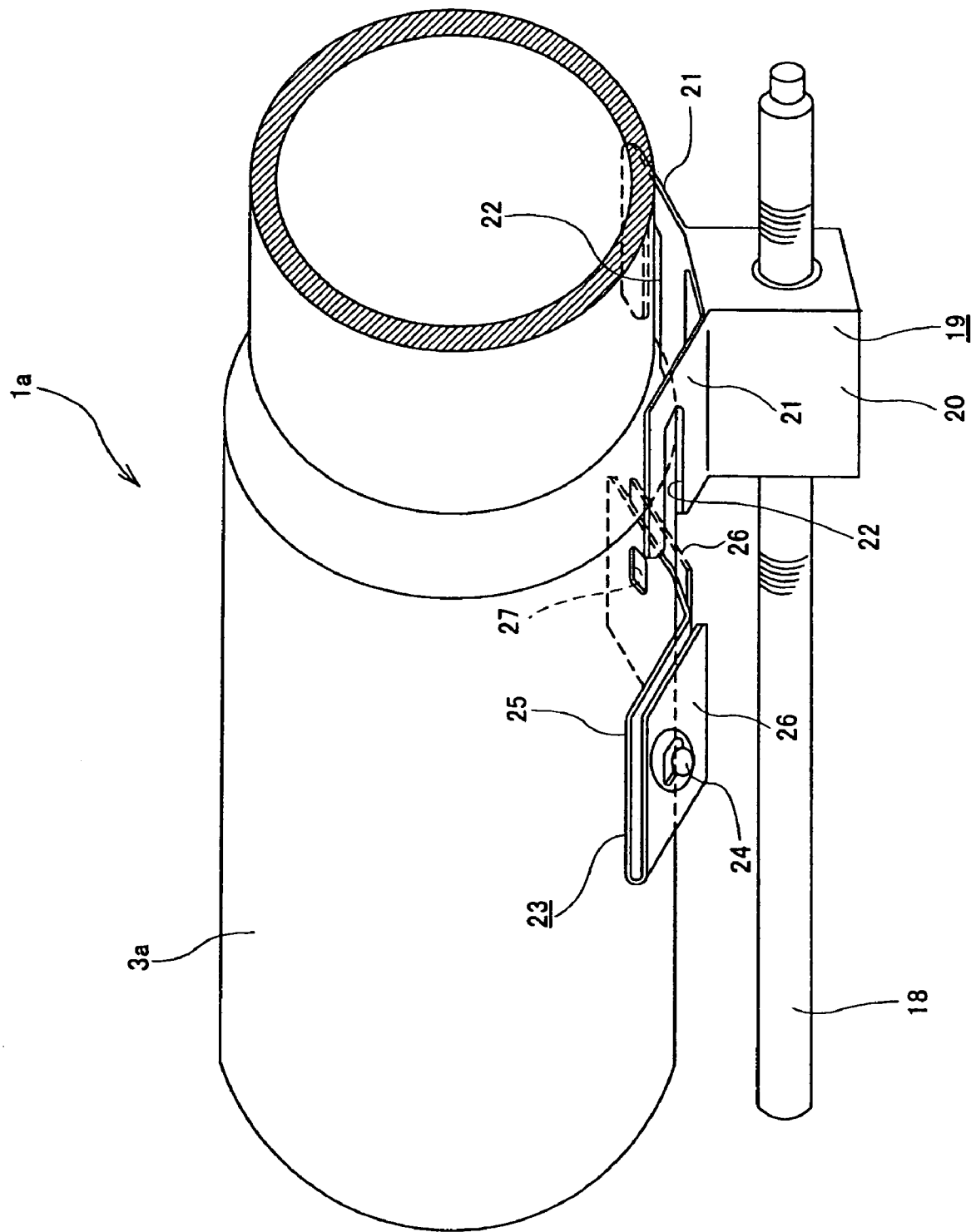
FIG. 5 is a perspective side view of the main parts of example 1.
Figure 36:
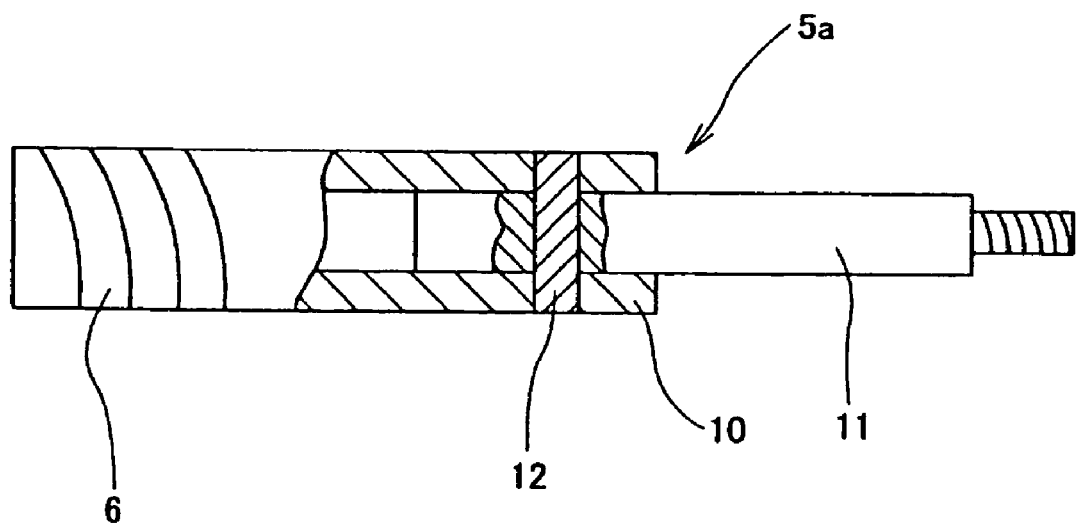
FIG. 36 is a partially sectioned side elevation of a threaded rod showing a second example of the conventional structure.

When only the inner column 3a is displaced forward in this manner, as shown in FIGS. 4 and 5, the two screws 24 exit from the mounting holes 22 formed in the flange parts 21 of the joining bracket 19, and the joining bracket 19 is detached from the inner column 3a. The two flange parts 21 are sandwiched between the bottom surfaces of the two end parts of the base part 25 and the top surfaces of the return part 26, which are covered with a low friction material as mentioned previously. Accordingly, detachment of the two flange parts 21 provided on the joining bracket 19, from the inner column 3a happens smoothly without causing such a large resistance as would increase the impact applied to the body of the driver who collides with the steering wheel 8. Moreover in the state in which the joining bracket 19 is detached from the inner column 3a, the threaded rod 18 offers no resistance to the inner column 3a being displaced forward. Therefore, the steering wheel 8 is displaced smoothly further forward through the position shown by solid lines from the position shown by chain lines in FIG. 4. As a result, the impact applied to the body of the driver who collides with the steering wheel 8 is relieved, and hence an improvement in the protection of the driver can be achieved. Moreover, in the case of the present example, since the threaded rod 18 is not required to be a two-piece construction as in the conventional construction as shown in FIG. 36 described previously, it is possible to ensure silence during position adjustment of the steering wheel 8.

EXAMPLE 2

Figure 6:
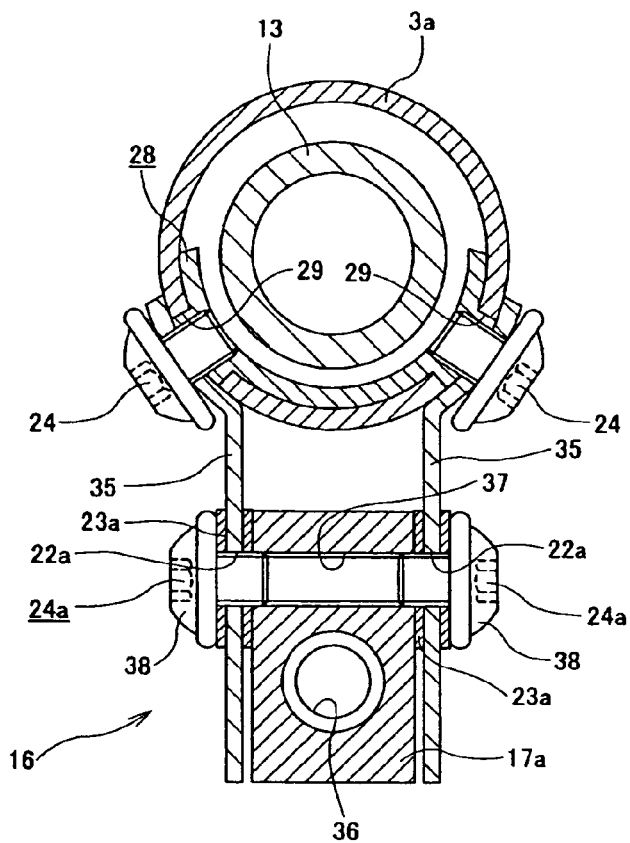
FIG. 6 is a similar diagram to FIG. 2 showing example 2 of the present invention.

FIG. 6 shows example 2 of the present invention. In the case of the present example, the top end parts of a pair of joining plates 35 are screwed to the bottom surface of an inner column 3a in a state in which the two joining plates 35 hang down from the bottom surface of the inner column 3a. Moreover a rectangular shaped nut 17a constituting a feed screw mechanism 16 (refer to FIGS. 1, 4 and 5 regarding overall structure) is supported between the lower halves of the two joining plates 35 by a pair of screws 24a such that it can be detached by a shock load. Therefore, regarding the nut 17a used in the present example, in addition to the threaded hole 36 for constituting the feed screw mechanism 16, a second threaded hole 37 is formed in a torsional direction (left/right direction above the threaded hole 36) turned perpendicular to the threaded hole 36.

The two screws 24a that are inserted through mounting holes 22a formed in the central parts of the two joining plates 35 are screwed into the second threaded hole 37, and then tightened. The two mounting holes 22a are of notch shapes, which are open at the rear ends of the central parts of the two joining plates 35. Here, in the case of the present example also, sliding plates 23a are sandwiched between each of the two side surfaces of the lower half parts of the two joining plates 35, the two side surfaces of the top of the nut 17a, and the heads 38 of the two screws 24a.

In the case of the present example, when the inner column 3a is displaced forward accompanying a secondary collision, the two screws 24a exit from the rear end side opening of the two mounting holes 22a toward the rear of the two joining plates 35. In other words, maintaining the fore-aft position of the nut 17a as it is, the two joining plates 35 are displaced forward together with the inner column 3a. Moreover the threaded rod 18 (refer to FIGS. 1, 4 and 5) constituting the feed screw mechanism 16 is prevented from interfering with the forward displacement of the inner column 3a. The constructions and operations of the other parts are the same as in example 1 described before, and hence illustrations and descriptions relating to identical parts are omitted.

EXAMPLE 3

Figure 7:
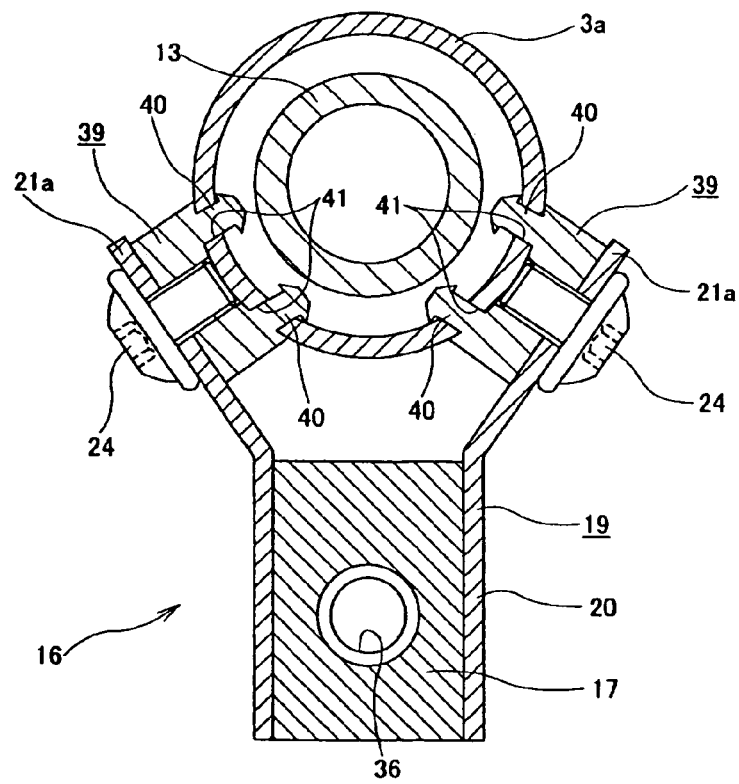
FIG. 7 is a similar diagram to FIG. 2 showing example 3 of the present invention.

FIG. 7 shows example 3 of the present invention. In the case of the present example, similarly to the case of example 1 described previously, a rectangular shaped nut 17, being the driven member, is retained and fixed in a joining bracket 19. A pair of flange parts 21a provided on the top half part of the joining bracket 19 is supported on the outer peripheral surface of the inner column 3a constituting a telescopic steering column, via two joining members 39. The two joining members 39 are formed from a synthetic resin such as a polyamide resin, polyacetal resin or the like. A plurality of round rod shaped projections 40 is provided on the internal circumference side faces of the two joining members 39. The projections 40 of each of the two joining members 39 are inserted through holes 41 formed in the inner column 3a in a state in which the two internal circumference side faces butt up against the two side parts of the bottom surface of the inner column 3a. Furthermore the tip ends of each of the projections 40 are melted to enlarge their diameters, to thereby support the joining members 39 on the two side parts of the bottom surface of the inner column 3a.

Moreover, the top half parts of the two flanges 21a are supported and fixed on the two joining members 39 by screws 24. Mounting holes formed in the two flanges 21a for the insertion of the two screws 24 are simple holes (not notch shapes that are open to any one of the edges). Furthermore, the projections 40 have a suitable strength such that they can be broken accompanying the impact of a collision accident, by controlling the material forming the two joining members 39, and the outer diameters of the projections 40 appropriately.

In the case of the present example, when the inner column 3a is displaced forward accompanying a secondary collision, the projections 40 are broken by the shear force acting between them and the holes 41. Moreover the inner column 3a is displaced forward leaving the fore-aft position of the nut 17, the joining bracket 19 containing the two flanges 21a, and the two joining members 39 as they are. Furthermore the threaded rod 18 (refer to FIGS. 1, 4 and 5) constituting the feed screw mechanism 16, is prevented from interfering with the forward displacement of the inner column 3a. The constructions and operations of the other parts are the same as in examples 1 and 2 described above, and hence illustrations and descriptions relating to identical parts are omitted.

EXAMPLE 4

Figure 8:
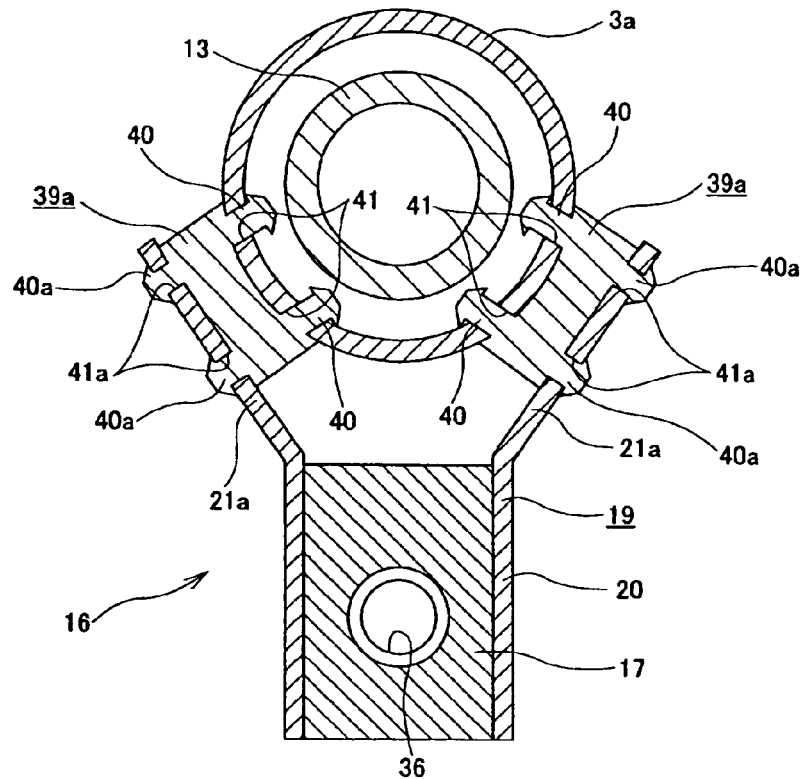
FIG. 8 is a similar diagram to FIG. 2 showing example 4 of the present invention.

FIG. 8 shows example 4 of the present invention. In the case of the present example, the joined parts between joining members 39a formed from a synthetic resin and a pair of flange parts 21a provided on the top half part of a joining bracket 19, are formed by engaging round rod shaped projections 40a formed on the joining members 39a and holes 41a formed in the flange parts 21a. Accordingly, in the case of the present example, when a secondary collision occurs, the projections 40 and 40a are broken at either or both of the parts where the projections 40a and the holes 41a are engaged, and the parts where the projections 40 and the holes 41 are engaged, which allows the inner column 3a to be displaced forward. The constructions and operations of the other parts are the same as in example 3 described above, and hence illustrations and descriptions relating to identical parts are omitted.

EXAMPLE 5

Figure 9:
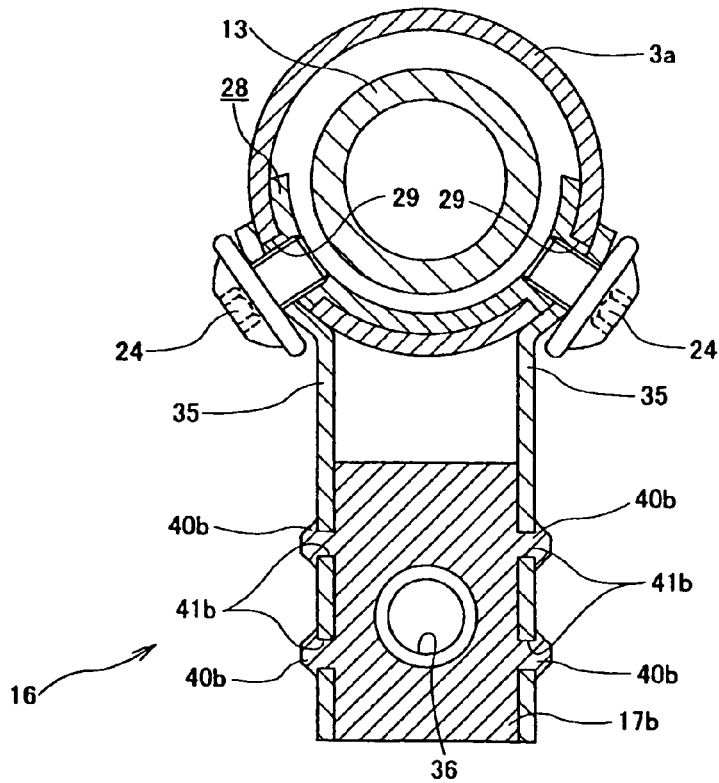
FIG. 9 is a similar diagram to FIG. 2 showing example 5 of the present invention.

FIG. 9 shows example 5 of the present invention. In the present example, a nut 17b, which constitutes a feed screw mechanism 16 (refer to FIGS. 1, 4 and 5) together with a threaded rod 18, is formed from a synthetic resin. Projections 40b provided on both of the right and left side faces of the nut 17b, and holes 41b formed in the lower part of a pair of joining plates 35, the top ends of which are each joined and fixed to the bottom surface of the inner column 3a, are engaged to support the nut 17b on the underside of the inner column 3a. Accordingly, in the case of the present example, at the time of a secondary collision, each of the projections 40b is broken at the parts where the projections 40b and the holes 41b are engaged, which allows the inner column 3a to be displaced forward. The constructions and operations of the other parts are the same as in the aforementioned example 2 shown in FIG. 6, and hence illustrations and descriptions relating to identical parts are omitted.

EXAMPLE 6

Figure 10:
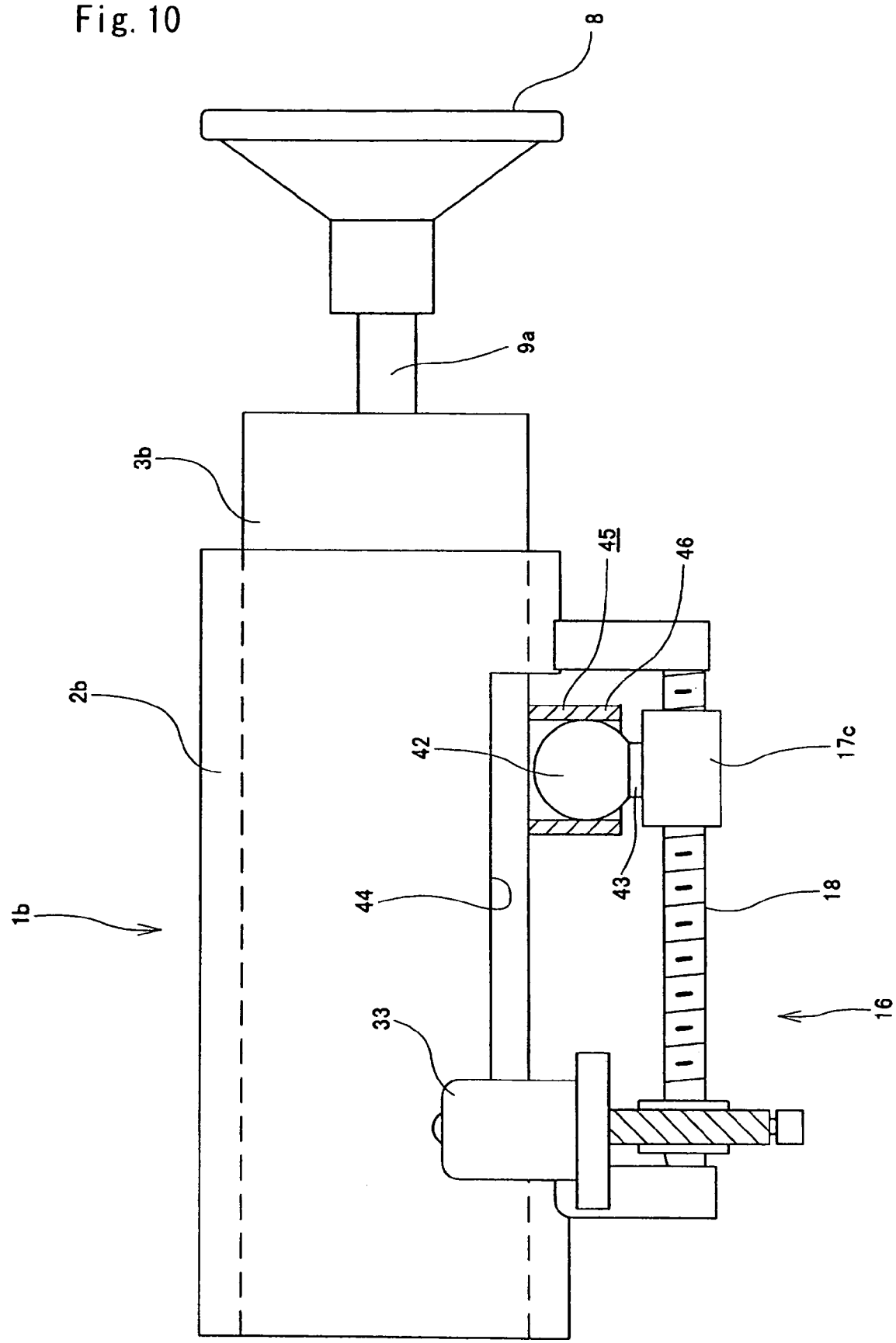
FIG. 10 is a simplified vertical sectional side elevation showing the main parts of example 6 of the present invention.

FIG. 10 shows example 6 of the present invention. In the case of the present example, a sphere 42 is provided on top of a nut 17c, which constitutes a feed screw mechanism 16 together with a threaded rod 18, via a connecting part 43 with a smaller diameter than the sphere 42. On the other hand, of an outer column 2b and an inner column 3b, which constitute a telescopic steering column 1b, the outer column 2b has an elongate through hole 44 formed in the bottom surface part at the rear in the fore-aft direction (the left/right direction in FIG. 10). Furthermore, a joining bracket 45 is supported on part of the bottom surface of the middle part of the inner column 3b corresponding to the steering column, that is exposed by the through hole 44. The joining bracket 45 is mounted on the outer peripheral surface of the inner column 3b such that it can be detached from the inner column 3b based on the shock load applied at the time of a collision.

The construction of the part where the joining bracket 45 is mounted on the outer peripheral surface of the inner column 3b such that it can be detached is not specifically limited. For example, a construction can be used in which the whole of the joining bracket 45 is formed from a synthetic resin, and a plurality of projections, each being of a pin shape provided on the top surface of the joining bracket 45, is inserted into holes formed in the bottom surface part of the inner column 3b from beneath, and the top end parts of each of the projections are heated to expand the diameters into rivet shapes. Alternatively, it is also possible that the joining bracket 45 is formed from a metal of the same material as the inner column 3b, and the joining bracket 45 and the inner column 3b are joined by a spot weld of a suitable strength (with a short weld length) that can be broken by the shock load accompanying a secondary collision. Whichever is used, the joining bracket 45 has a cylindrical part 46 that opens downward, and the sphere 42 is fitted into the cylindrical part 46.

In the case of the present example with such a construction, if the nut 17c is moved along the threaded rod 18 accompanying the current supplied to the electric motor 33, the inner column 3b is displaced in the axial direction, and hence the fore-aft position of the steering wheel 8 is adjusted. At the time of a secondary collision, the joining bracket 45 comes off from the inner column 3b and prevents the threaded rod 18 from resisting the forward displacement of the inner column 3b.

Especially in the case of the present example, it is possible for the sphere 42 to be displaced in the axial direction (vertical direction) of the cylindrical part 46 inside the cylindrical part 46. Therefore, even if the relationship between the positions of the inner column 3b and the threaded rod 18 is not controlled exactly, in other words, even if the inner column 3b and the threaded rod 18 are slightly off parallel, it is possible to reliably transmit the movement of the nut 17c screwed onto the threaded rod 18, to the inner column 3b. Therefore, it is not necessary to control the form accuracy and the dimensional accuracy required for the components, nor the assembling accuracy of each of the components exactly, which are advantages from the aspect of cost reduction.

Figure 35:
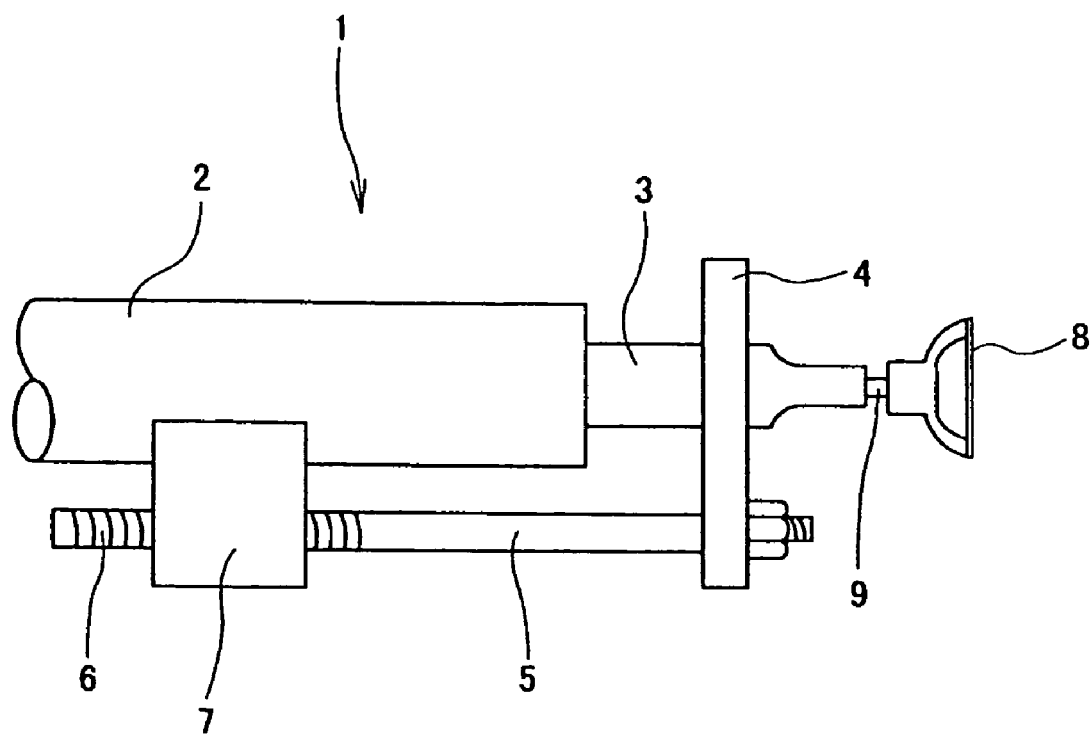
FIG. 35 is a simplified side elevation showing a first example of a conventional structure.

Here, it is also possible for the present invention to be used in the construction shown in FIG. 35, wherein the end of the threaded rod (driving rod 5) can be supported on the steering column such that it comes off at the time of a secondary collision.

Furthermore, in the case of implementing the present invention, it is also possible to arrange the feed screw mechanism the other way around from the example shown in the drawing. That is, the arrangement may be such that the nut is supported on the outer column side, and the motor, a speed reducer and the threaded rod are provided on the inner column side.

Alternatively, it is also possible that the proximal end part of the threaded rod is supported on either one of the columns in a state in which it does not rotate, and a nut screwed onto the threaded rod is supported on the other column such that it can only rotate freely, and the nut is rotated by the motor provided on the other column via the speed reducing mechanism.

Moreover, regarding the arrangement of the outer column and the inner column, it is also possible to arrange the outer column and the inner column at the rear and at the front respectively, being the opposite way around from the example illustrated. In this case, it is also possible to select appropriately the sides on which the threaded rod and the nut are arranged, and which one of the threaded rod and the nut is to be rotated.

EXAMPLE 7

FIGS. 11 to 14 show example 7 of the present invention. In all of the examples 1 to 6 described above, the outer column and the driving member are joined, and the inner column and the driven member are joined such that they can be detached. Conversely, in the case of the present example, an outer column and a driving member such that they can be detached, while a driven member is supported and fixed on an inner column. Therefore, in the case of the present example, an electric motor 33 is installed on the outer peripheral surface of an outer column 2a such that it can be detached based on the shock load applied at the time of a collision. In the case of the present example, the proximal end part (right side of FIG. 11 to 14) of a threaded rod 18a is joined and fixed to an inner column 3a via a joining bracket 19b. Accordingly, in the case of the present example, the threaded rod 18a does not rotate. That is, the threaded rod 18a and the joining bracket 19b correspond to the driven members. A nut 63, being the driving member, is screwed onto the threaded rod 18 in a state in which it is supported in a speed reducer case 47 such that it can only rotate freely.

In the case of the present example, the nut 63 is engaged with a worm wheel 64 by forming a threaded hole in the center of the worm wheel 64 constituting the speed reducer. Moreover the worm wheel 64 can be rotated and driven freely by a worm 65 fixed on the output shaft of the electric motor 33. Since constructed in this manner, by supplying current to the electric motor 33, and rotating and driving the worm wheel 64, the threaded rod 18a and the joining bracket 19c are displaced in the axial direction. As a result, a steering shaft 9a is displaced in the axial direction together with the inner column 3a to which the joining bracket 19b is joined and fixed, and hence the fore-aft direction of the steering wheel 8 (refer to FIGS. 12 and 14) supported and fixed to the rear end part of the steering shaft 9a can be adjusted.

Furthermore, at the time of a secondary collision, the electric motor 33 comes off from the outer column 2a together with the worm wheel 64 formed integral with the nut 63, being the driving member. Therefore, in the case of the present example, the joining bracket 48 that supports the electric motor 33 and the speed reducer case 47 is installed on the outer peripheral surface of the outer column 2a such that it can be detached based on the shock load applied at the time of a collision, using a similar construction to the case of example 1 shown in FIGS. 1 to 5. Therefore, notch shaped mounting holes 50, which are open toward the rear end (right end in FIGS. 11 and 13), are formed in flange parts 49 of the joining bracket 48. Screws 24b are inserted into the mounting holes 50, and the screws 24b are screwed firmly into threaded holes which are provided by means of protuberances or nut plates provided on the outer peripheral surface of the outer column 2a. Coated plates 52 which are covered by a low friction material, are interposed between the two sides of the flange parts 49, and the outer peripheral surface of the outer column 2a and the heads of the screws 24b, and are intended to reduce the friction between each of the surfaces in contact. Furthermore, the reason that the threaded holes are provided in the outer peripheral surface of the outer column 2a as described above is to prevent the screws 24b from protruding on the inner diameter side of the outer column 2a and interfering with the inner column 3a that is fitted into the outer column 2a and displaced relative to the outer column 2a at the time of a secondary collision.

Figure 11:
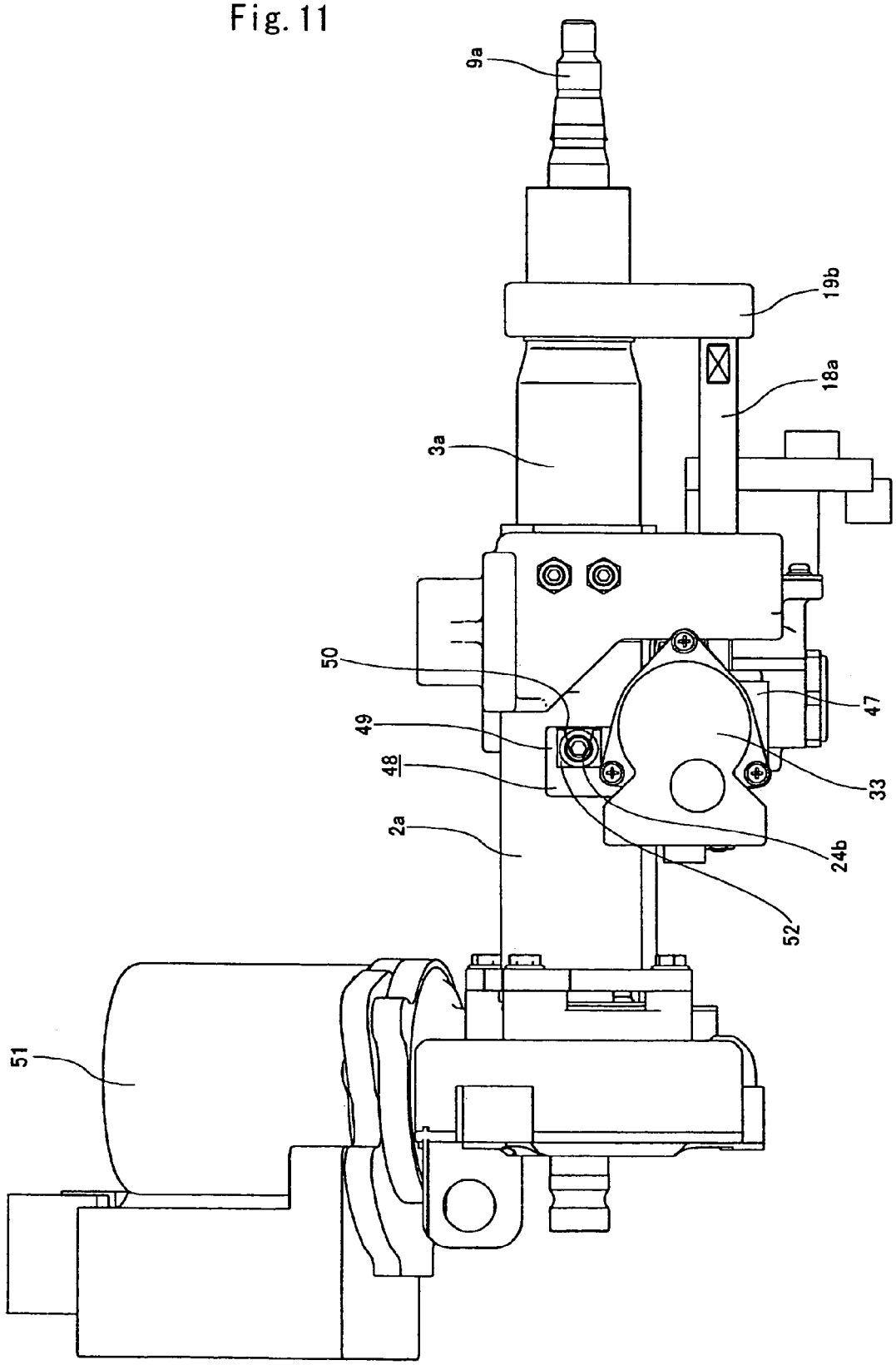
FIG. 11 is a side elevation showing the main parts of example 7 of the present invention in a normal state.
Figure 12:
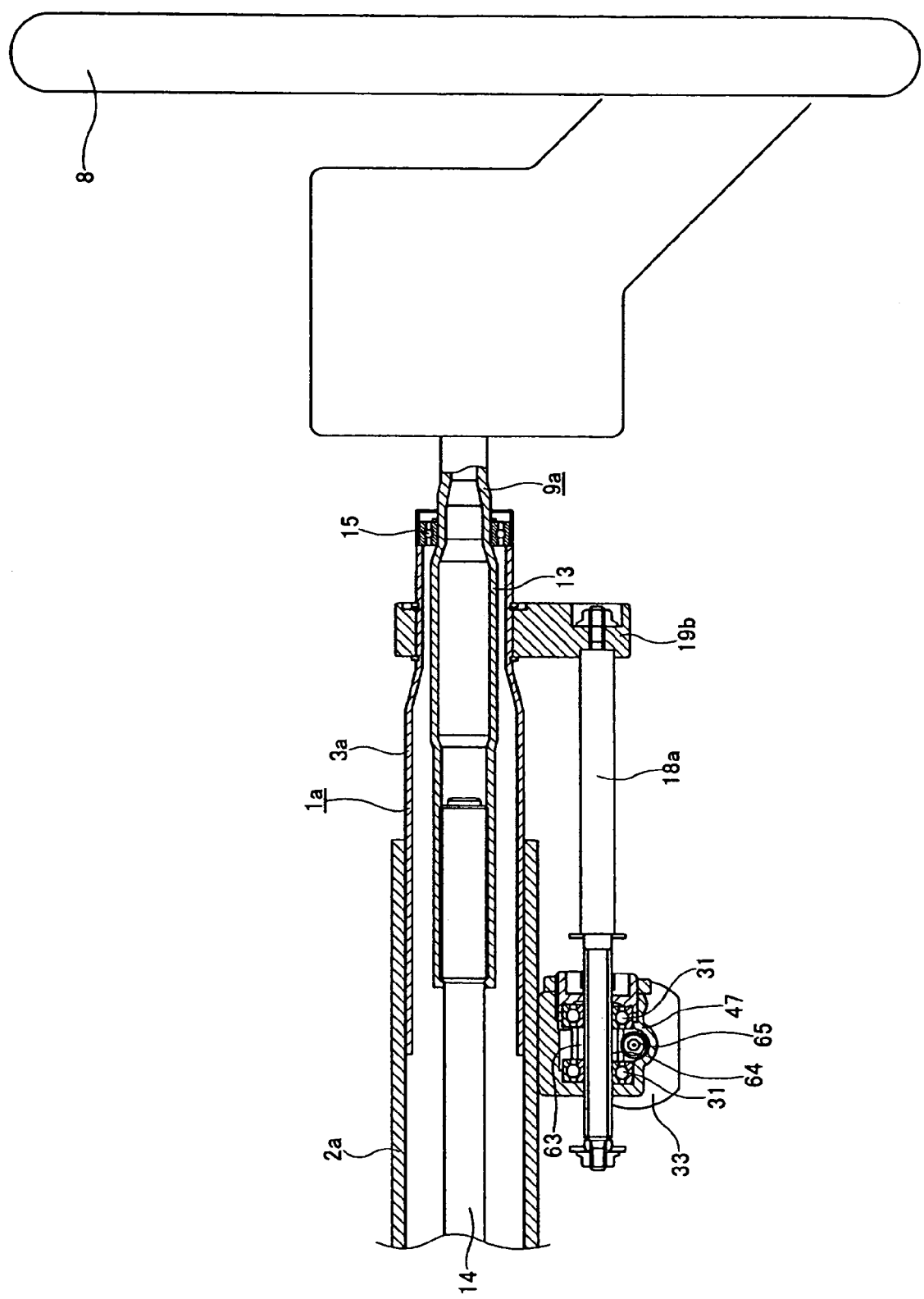
FIG. 12 is a cross-sectional view of example 7 in a normal state.
Figure 13:
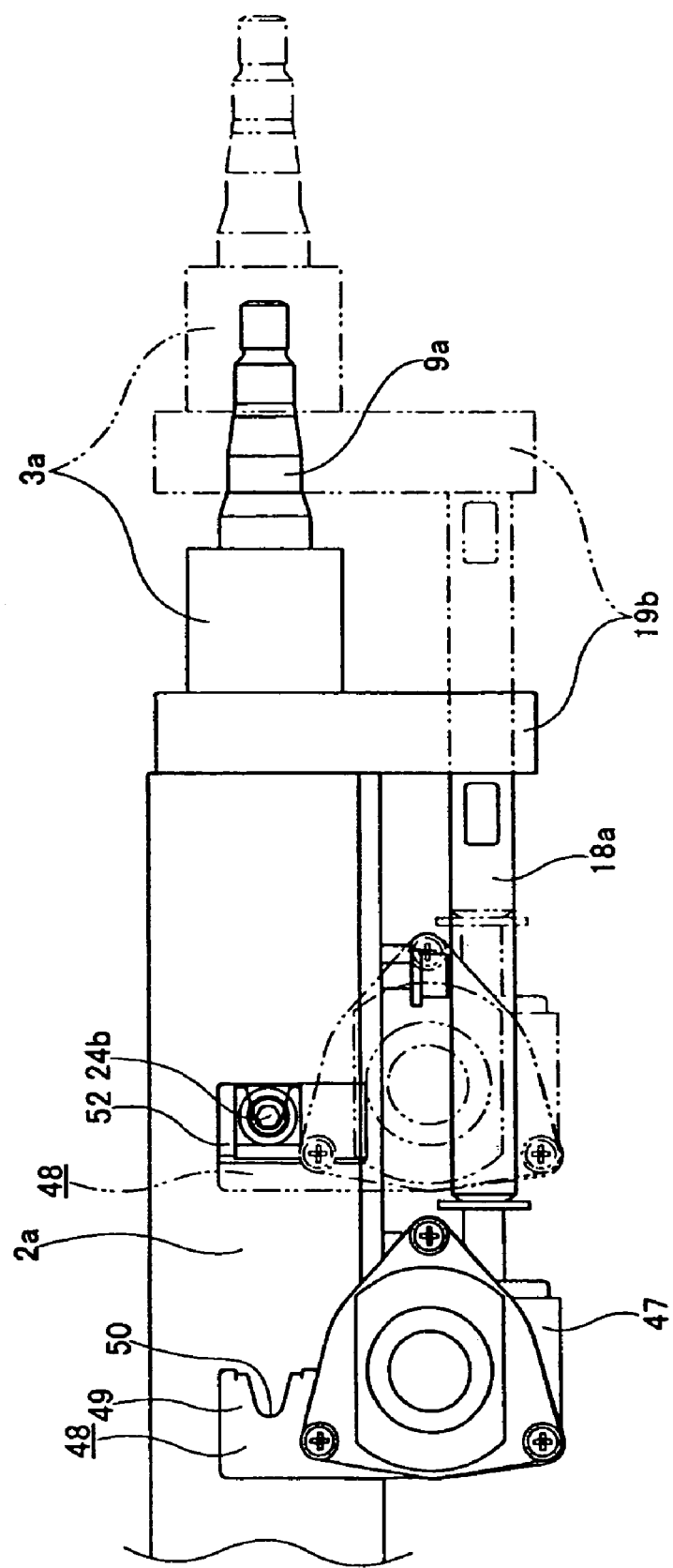
FIG. 13 is a side elevation of the main parts of example 7, shown in a state in which a secondary collision occurs.
Figure 14:
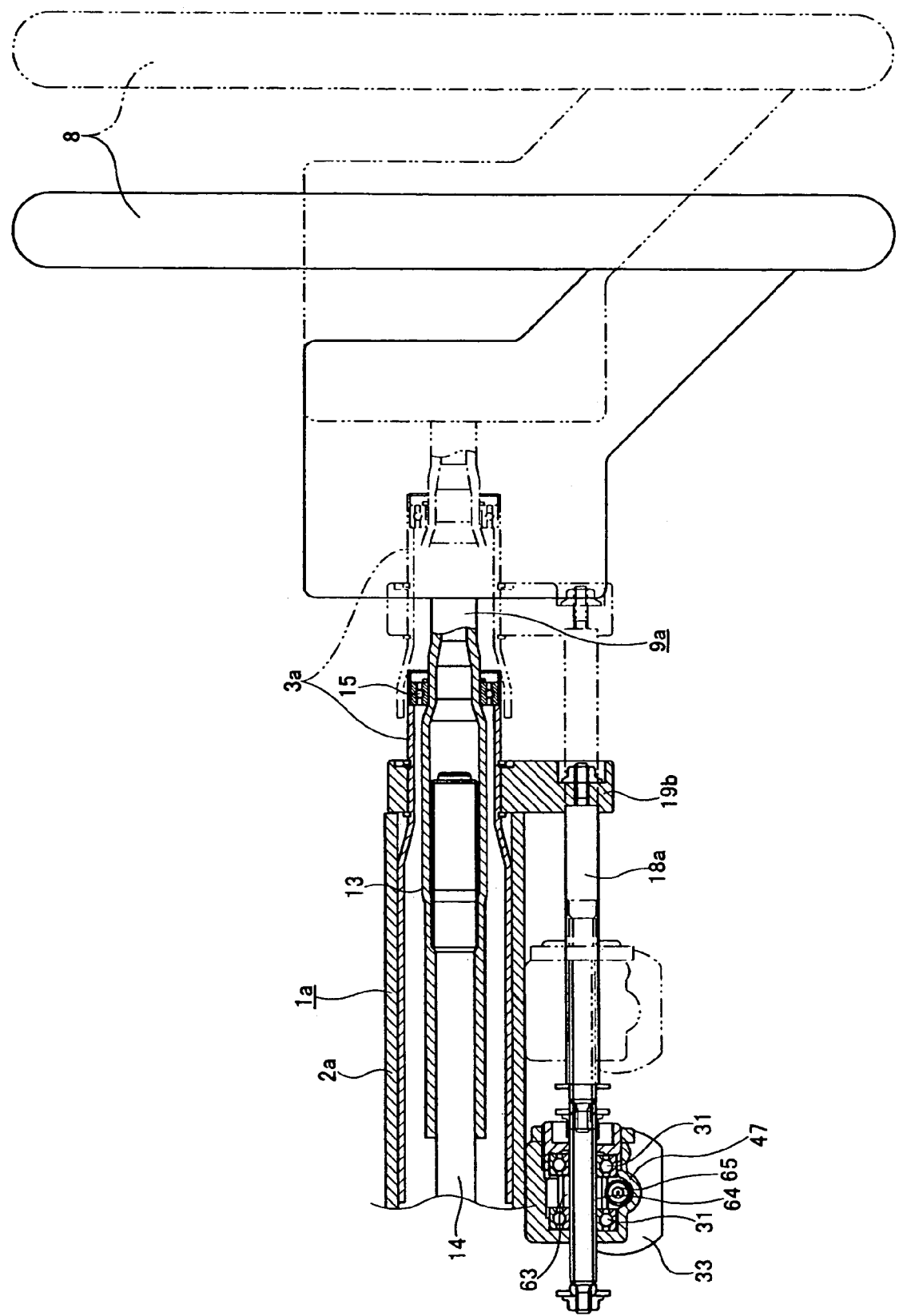
FIG. 14 is a cross-sectional view of example 7 in a state in which a secondary collision occurs.

At the time of a secondary collision, the inner column 3a is displaced from the position shown by chain lines to the position shown by solid lines in FIG. 14, for example. Moreover, as the threaded rod 18a is displaced forward (left side of FIGS. 11 to 14) together with the inner column 3a, the screws 24b screwed to the side of the outer column 2a, as shown by solid lines in FIG. 13, exit from each of the mounting holes 50, and the flange parts 49 exit from the coated plates 52, and hence the joining bracket 48 is separated from the outer column 2a. As a result, the electric motor 33 is displaced forward together with the worm wheel 64, and hence the threaded rod 18a and the worm wheel 64 are prevented from resisting the forward displacement of the steering wheel 8. Here, the constructions shown in FIG. 6 to 8 may also be used for a construction whereby the electric motor 33 is supported on the outer column 2a such that it can come off. Moreover, an electric motor 51 shown on the left side of FIG. 11 is for auxiliary power of electric power steering, which is not related to the present invention. Furthermore, the shapes of the components, such as the electric motor 33 and the like, shown in FIG. 11, and the shapes of the components shown in FIGS. 12 to 14 are slightly different, but they are essentially the same.

EXAMPLE 8

Figure 15:
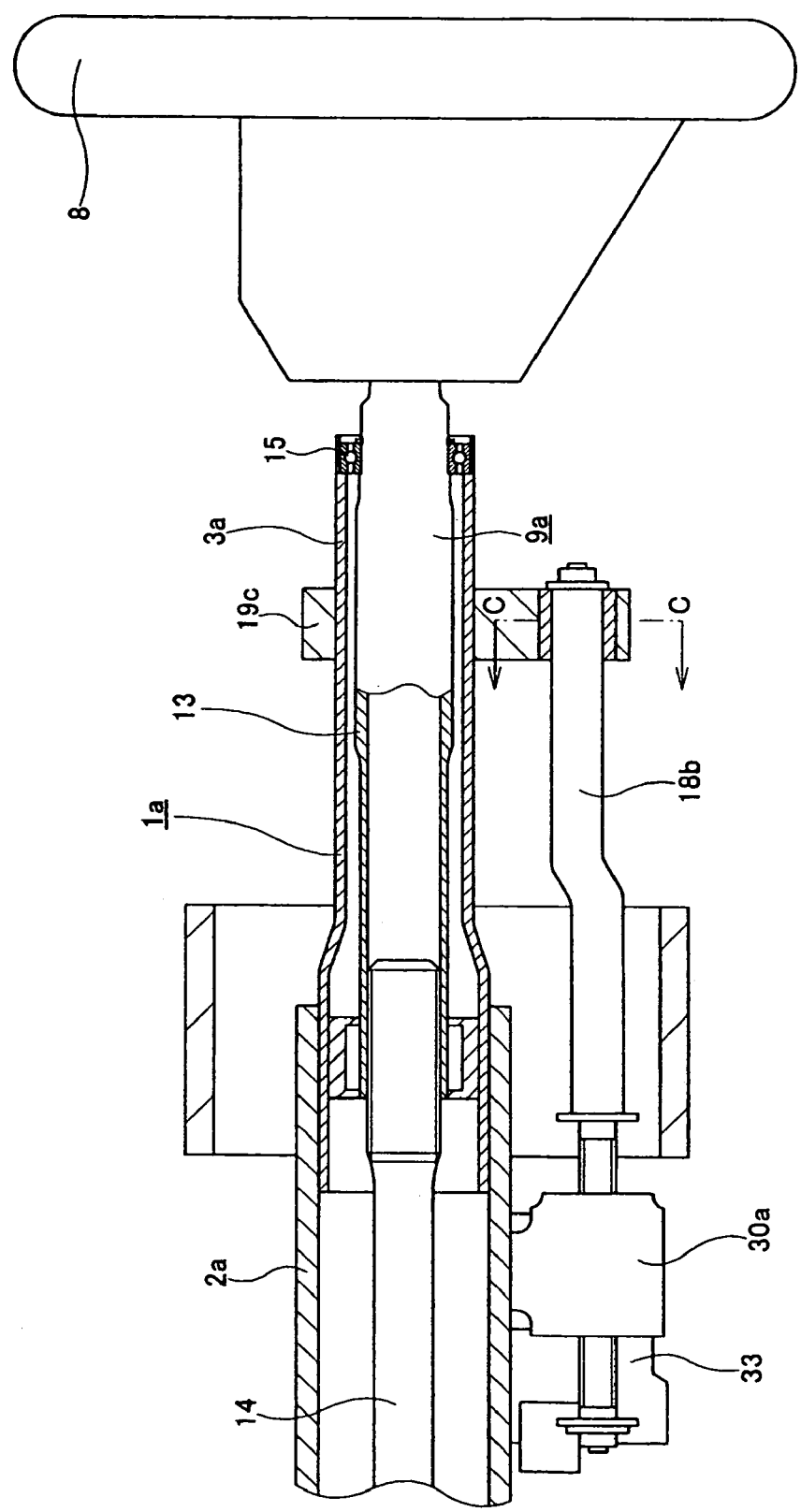
FIG. 15 is a vertical sectional side elevation showing the main parts of example 8 of the present invention in a normal state.
Figure 16:
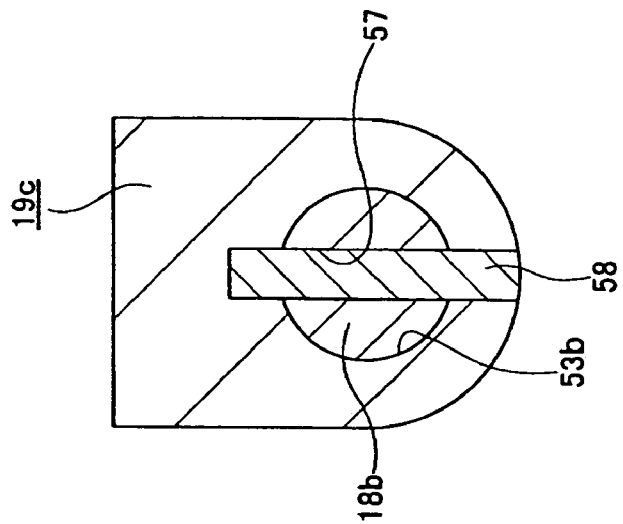
FIG. 16 is enlarged cross-sectional views through C-C of FIG. 15 showing three examples of the structure of a joined part between a threaded rod and a joining bracket.
Figure 16:
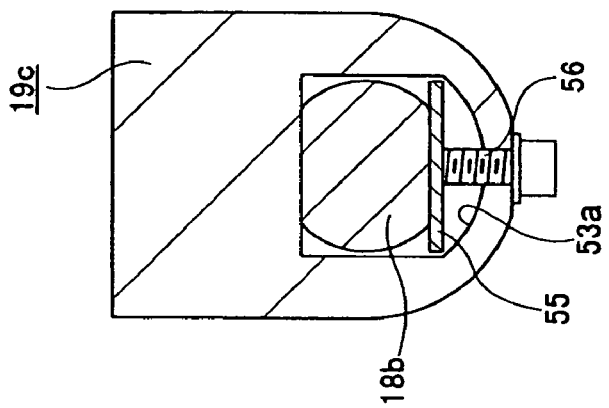
Figure 16:
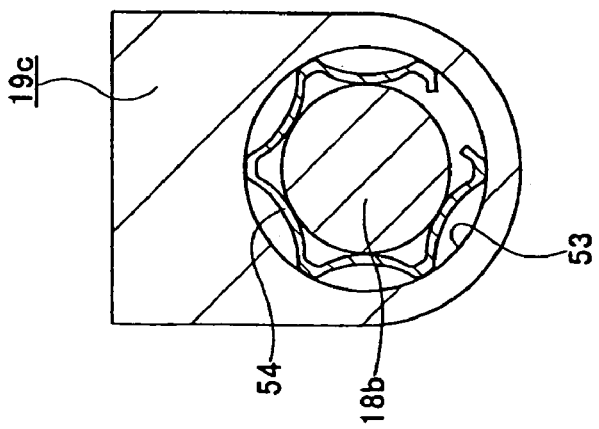
Figure 17:
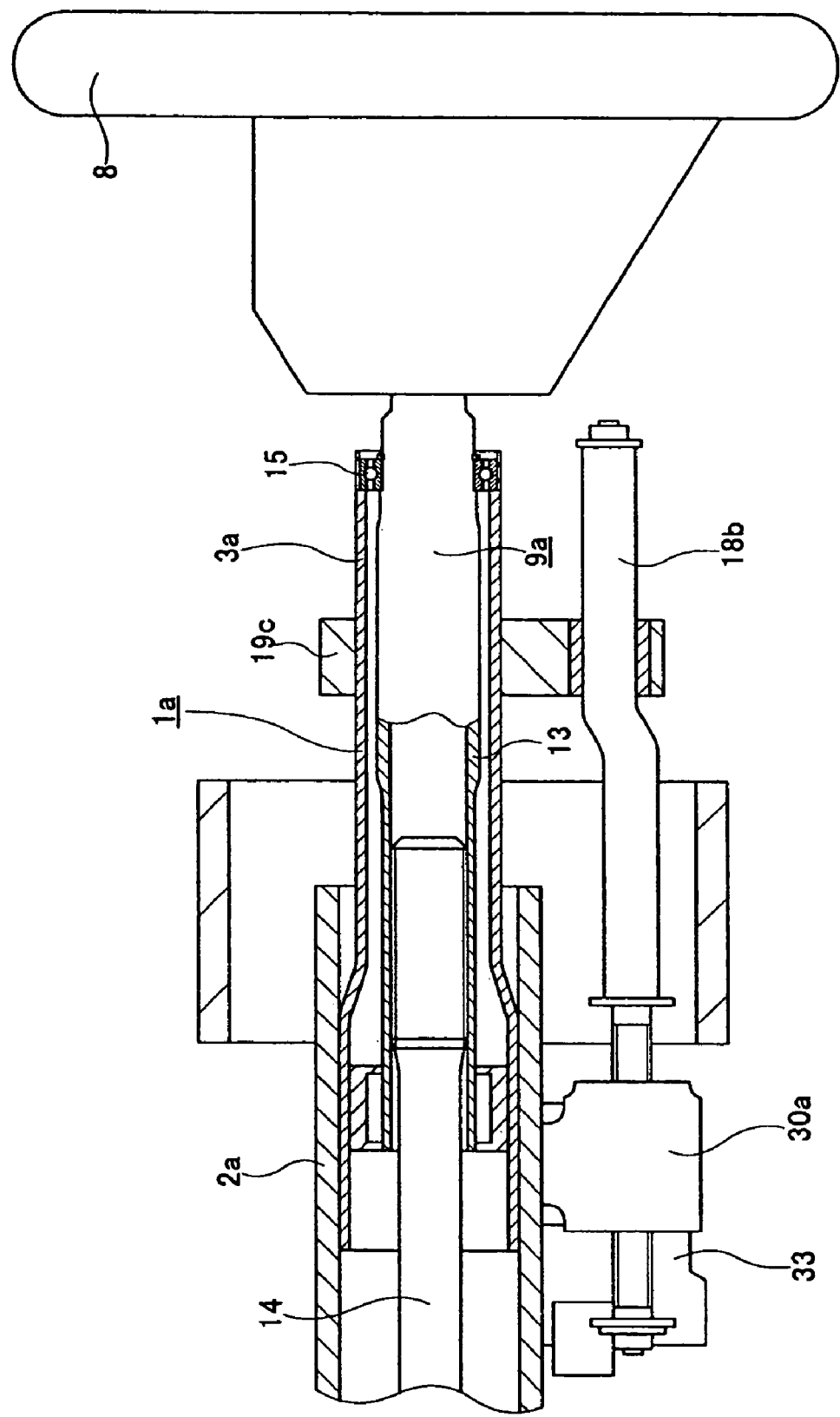
FIG. 17 is a vertical sectional side elevation showing the main parts of example 8 of the present invention in a state in which a secondary collision occurs.

FIGS. 15 to 17 show example 8 of the present invention. In the case of the present example, the construction of the above-described example 7 is improved, so that when a steering wheel 8 is displaced forward accompanying a secondary collision, components such as an electric motor, a speed reducer, and the like, which are comparatively bulky, are not displaced forward. That is, in the case of the above-described example 7 shown in FIGS. 11 to 14, when the joining bracket 48 comes off from the outer column 2a at the time of a secondary collision, the whole drive unit for displacing the threaded rod 18a in the axial direction, such as the electric motor 33, the speed reducer, and the like, is displaced forward. Since the drive unit is comparatively bulky, it is necessary to ensure a comparatively large space in front of the drive unit in order to displace the drive unit forward smoothly. Hence there is a possibility of reducing the degree of freedom of the design of the surroundings of the steering device. The present example takes such situations into consideration, and is designed to realize a construction in which the volume of the parts that are displaced forward at the time of a secondary collision can be minimized.

In order to implement the construction as described above, in the case of the present example, the joined part between a joining bracket 19c fixed on an inner column 3a, and a threaded rod 18b is constructed such that it can be separated based on the shock load applied at the time of a collision. In the case of the present example, the joining bracket 19c corresponds to the driven member of the second aspect of the present invention, and the threaded rod 18b corresponds to the push-pull rod. Furthermore, a feed nut, being the driving member, is supported in a housing 30a fixed on the outer peripheral surface of the outer column 2a in a state in which it is screwed onto a male thread formed on the proximal end part (left end part in FIGS. 15 and 17) of the threaded rod 18b, such that it can only be rotated freely. Then, by rotating the feed nut by the electric motor 33 in a predetermined direction, the threaded rod 18b is displaced in the axial direction (left/right direction in FIGS. 15 and 17), and the inner column 3a is displaced in the axial direction via the joining bracket 19c, so that the fore-aft direction of the steering wheel 8 is adjusted.

In the case of the present example, the construction is such that the proximal end part (top end part) of the joining bracket 19c and the housing 30a are secured on the inner column 3a and the outer column 2a respectively, while the joining bracket 19c is displaced relative to the threaded rod 18b in the axial direction of the threaded rod 18b at the time of a secondary collision. Therefore, in the case of the present example, the joined part between the joining bracket 19c and the threaded rod 18b is constructed such that it can be separated based on the shock load applied at the time of a collision using any one of the constructions shown in FIG. 16.

First, in the construction as shown in FIG. 16(A), the tip end part (rear end part, right end part in FIG. 15) of the threaded rod 18b is inserted loosely into a round through hole 53 formed at the tip end of the joining bracket 19c. Moreover a spacer 54, which can be elastically deformed, is sandwiched between the inner peripheral surface of the through hole 53 and the outer peripheral surface of the tip end of the threaded rod 18b, in a state in which the dimensions related to the radial direction are compressed elastically. The spacer 54 may be of a type that is formed in a cylindrical shape from a metallic spring, called a tolerance ring, or a material with a large coefficient of friction and internal loss, such as rubber, vinyl, or the like, as shown in the figure. Whichever is used, a resistance is applied between the inner and outer peripheral surfaces of the spacer 54, and the inner peripheral surface of the through hole 53 and the outer peripheral surface of the tip end of the threaded rod 18b, which acts when adjusting the fore-aft direction of the steering wheel 8, and that is sufficiently larger than the force acting when the steering column 1a and the steering shaft 9a contract. However, this resistance is kept to a level at which it cannot support the shock load applied to the joined part at the time of a secondary collision.

Next, in the construction of the second example as shown in FIG. 16 (B), the tip end of a threaded rod 18b, whose cross section is an oval shape, is inserted into a through hole 53a having a flat part on part of its inner peripheral surface. The tip end of the threaded rod 18b is sandwiched between the flat part and a friction plate 55 formed from a material having a large coefficient of friction, and the friction plate 55 faces toward the flat part, and is pressed by a screw 56. With regard to the friction force acting between the outer peripheral surfaces (flat surfaces parallel to each other) of the threaded rod 18b and the flat part and the friction plate 55, similarly to the construction shown in FIG. 16(A), it is also sufficiently larger than the force acting when adjusting the fore-aft direction of the steering wheel 8, and is adjusted to a level at which it cannot support the shock load applied to the joined part at the time of a secondary collision.

Furthermore, in the construction of the third example as shown in FIG. 16(C), the tip end of the threaded rod 18b is inserted without a gap into a round through hole 53b formed at the tip end of the joining bracket 19c. A synthetic resin pin 58 inserted into an open hole 57 formed at the tip end of the threaded rod 18b in the radial direction bridges between the tip end of the threaded rod 18b and the joining bracket 19c. With regards to the strength of the pin 58, similarly to the construction shown in FIG. 16(A), it is also adjusted to a level at which it can sufficiently support the force acting when adjusting the fore-aft direction of the steering wheel 8, but can not support the shock load applied to the joined part at the time of a secondary collision.

Whichever construction is used, the threaded rod 18b exits based on the shock load applied at the time of a collision, and the inner column 3a is able to be displaced forward. That is, at the time of a secondary collision, the joined part between the joining bracket 19c and the threaded rod 18b is separated, and the joining bracket 19c is displaced forward relative to the threaded rod 18b. Then, as shown in FIG. 17, the inner column 3a is displaced forward together with the steering wheel 8, which relieves the impact applied to the body of the driver who collides with the steering wheel 8. Moreover, in the construction shown in FIG. 16(A), if the spacer 54 is formed from a material whose internal loss is large, such as rubber, vinyl or the like, when the feed nut is rotated and driven, it is possible to prevent the vibration of the electric motor 33 from being transmitted to the steering wheel 8 via the threaded rod 18b. Furthermore, according to the construction shown in FIG. 16(A), even in the case where the center of the through hole 53 and the center of the tip end of the threaded rod 18b are slightly shifted, this can be absorbed. Accordingly, the degree of tolerance of process errors and assembly errors of each of the components is increased, which is an advantage from the aspect of cost reduction.

In addition, in the case of the present example, by forming a substantially crank shaped bent part halfway along the threaded rod 18b, the front half and the rear half of the threaded rod 18b are offset. However, in the construction of the present example, a linear threaded rod in which the front half and the rear half are not offset as described above can be used. However, if the above-described offset threaded rod 18b is used, effects and benefits can be obtained whereby the amount (stroke) of displacement of the joining bracket 19c relative to the threaded rod 18b, after the joined part between the rear end part of the threaded rod 18b and the joining bracket 19c is separated, can be regulated independent of the full length of the threaded rod 18b.

EXAMPLE 9

Figure 18:
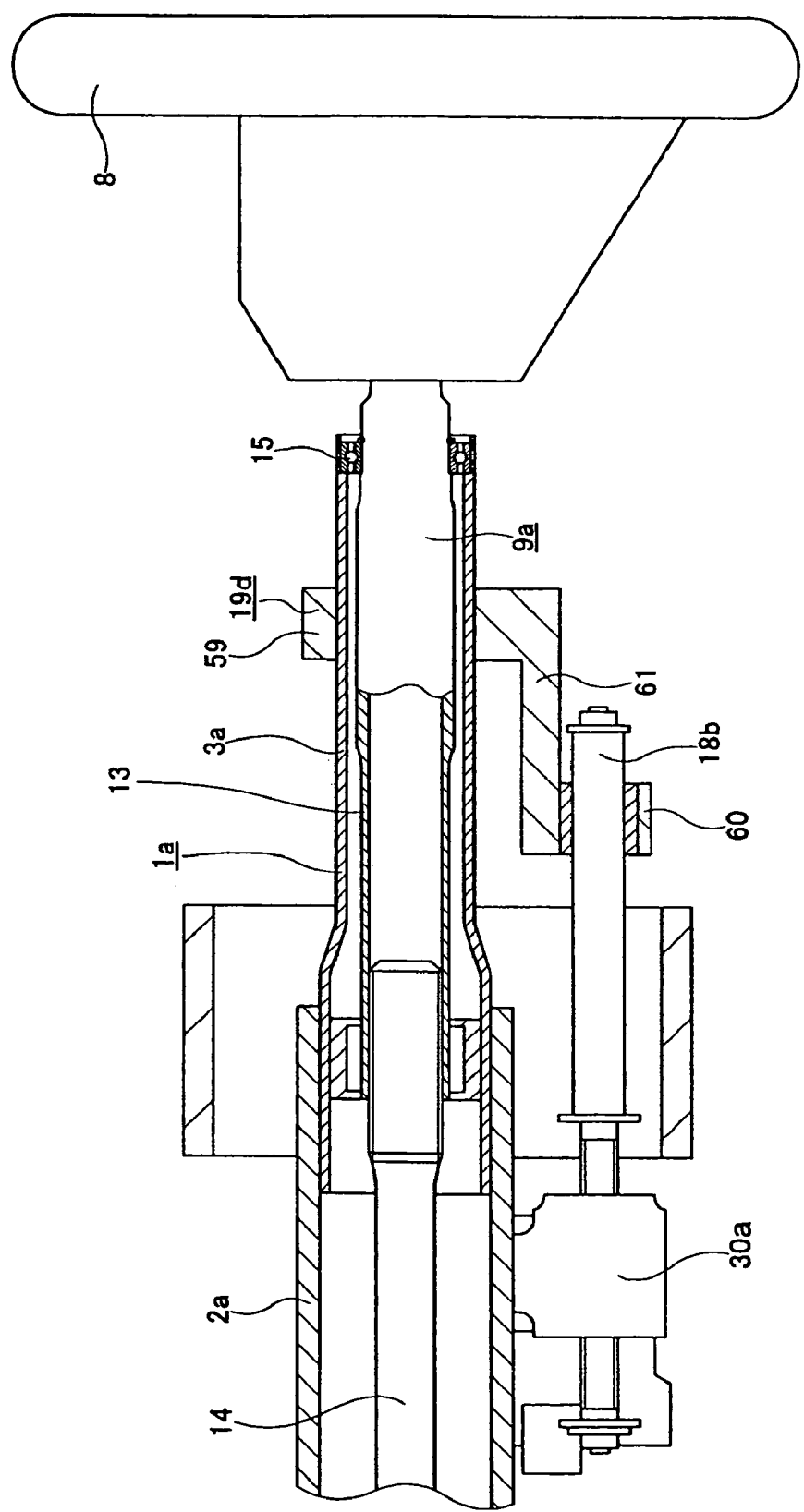
FIG. 18 is a vertical sectional side elevation showing the main parts of example 9 of the present invention in a normal state.
Figure 19:
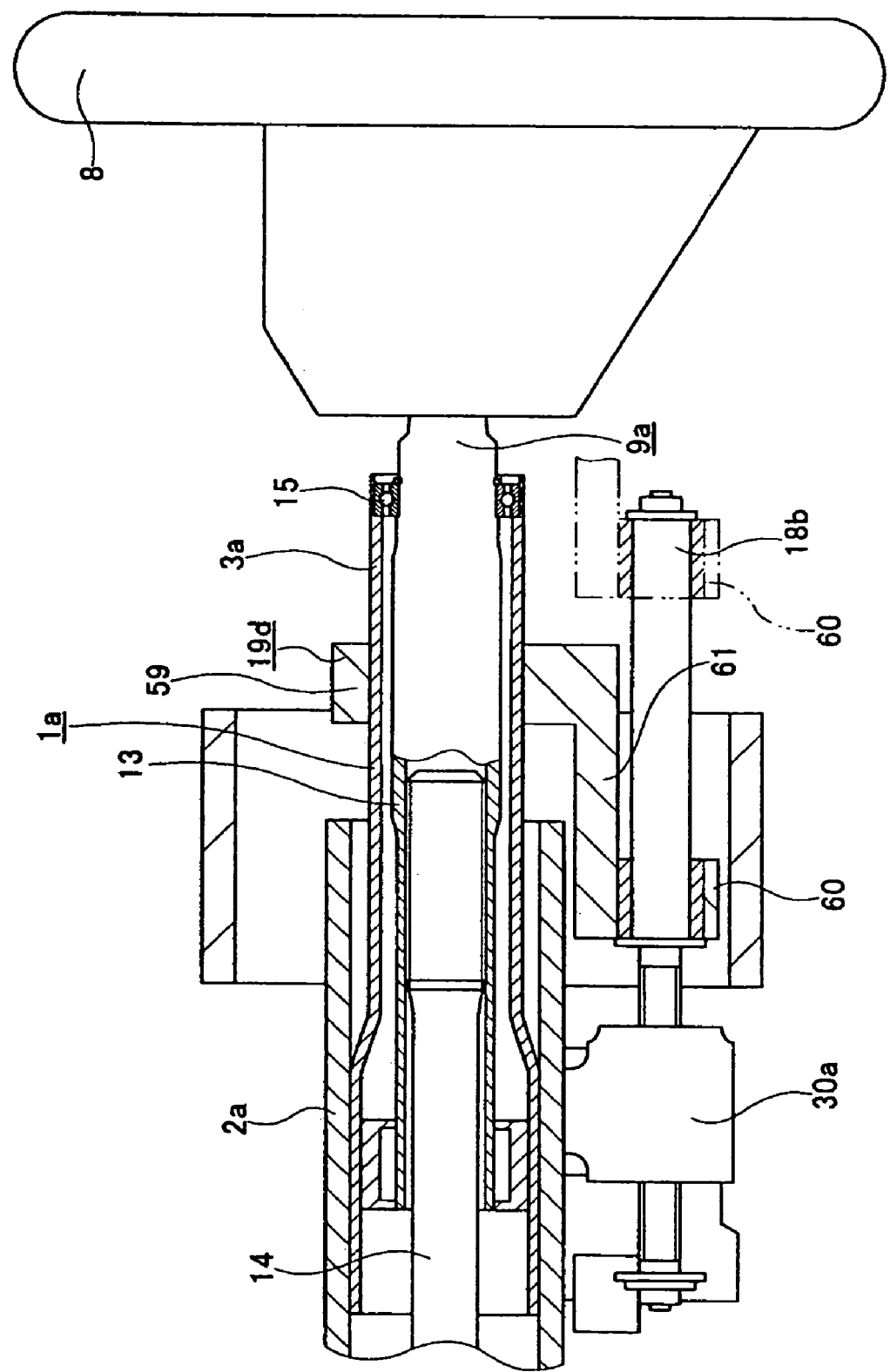
FIG. 19 is a vertical sectional side elevation showing the main parts of example 9 in a state in which a secondary collision occurs.

FIGS. 18 and 19 show example 9 of the present invention. In the case of the present example, the construction of the above-described example 8 is improved upon, and the arrangement is such that when a steering wheel 8 is displaced forward accompanying a secondary collision, it is difficult for the tip end (right end part in FIGS. 18 and 19) of a threaded rod 18b, and the steering wheel 8 or components attached to the steering wheel 8, to interfere.

Therefore, in the case of the present example, the shape of a joining bracket 19d that is secured on the inner column 3a is made a crank shape. That is, in the joining bracket 19d, a base part 59 for securing to the inner column 3a, which is provided on the rear end part (right end part in FIGS. 18 and 19), and a connecting part 60 which is provided forward (left in FIGS. 18 and 19) of the base part 59 in order to join with the tip end of the threaded rod 18b, are connected via a joining part 61 arranged parallel to the inner column 3a. The tip end of the threaded rod 18b is joined with the connection part 60 such that it can be separated at the time of a secondary collision using a similar construction to the above-described example 8. In the case of the present example, the linear dimension of the threaded rod 18b is shorter than in the case of example 8 by the distance that the connection part 60 is located forward.

In the case of the present example using the above-described construction, since the linear dimension of the threaded rod 18b is shorter in this manner, even in the case where the steering wheel 8 is displaced forward accompanying a secondary collision as shown in FIG. 19, it is difficult for the tip end of the threaded rod 18b, the steering wheel 8, or components such as a range of switches, airbags and the like, which are attached to the steering wheel 8, to interfere. Therefore, it is possible to achieve an improvement in the protection of the driver, such as smooth forward displacement of the steering wheel 8, and an increase in the degree of freedom in the design of the steering wheel 8 parts. The constructions and operations of the other parts are the same as in example 8.

EXAMPLE 10

Figure 20:
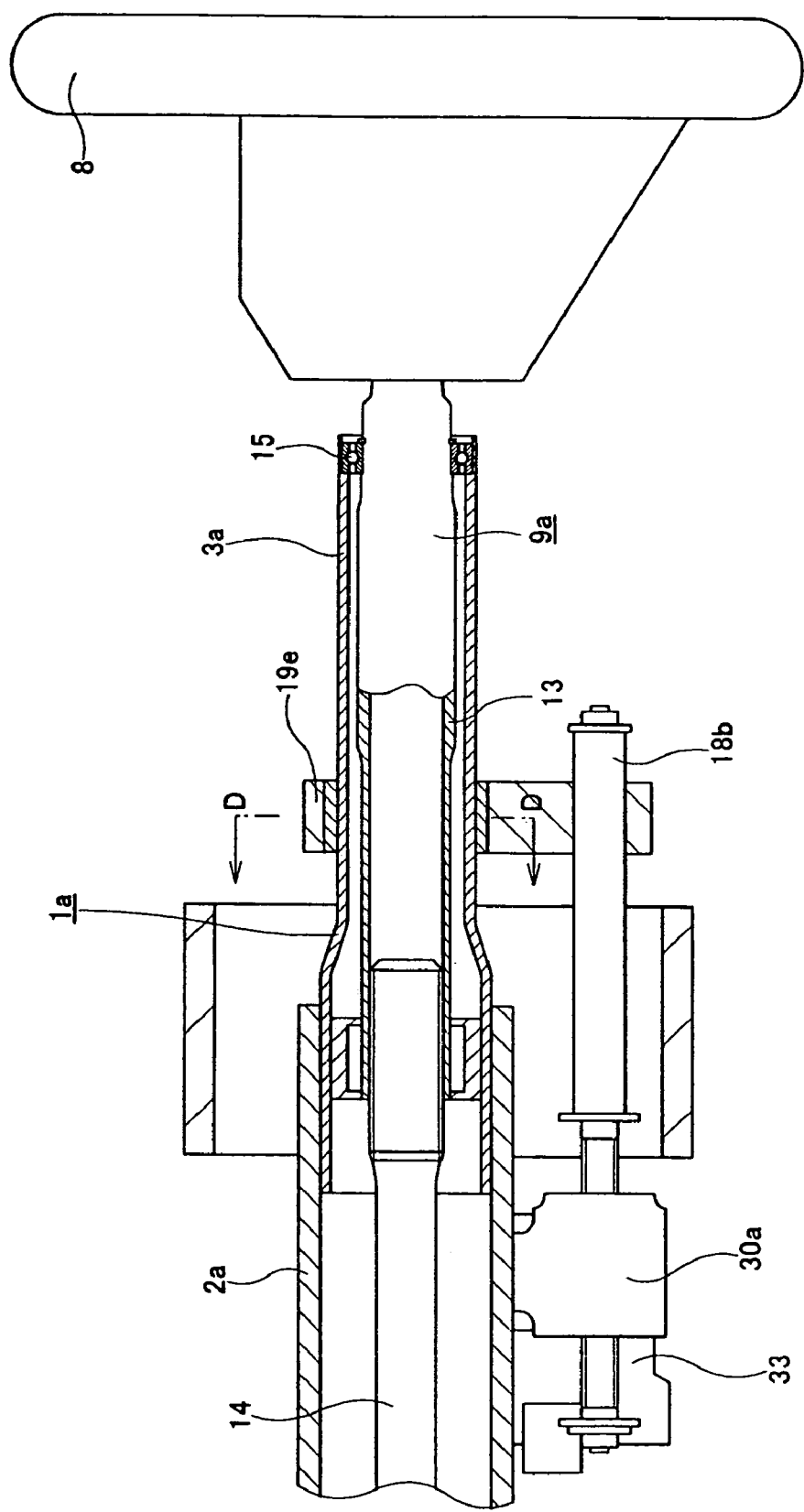
FIG. 20 is a vertical sectional side elevation showing the main parts of example 10 of the present invention in a state at a normal time.
Figure 21:
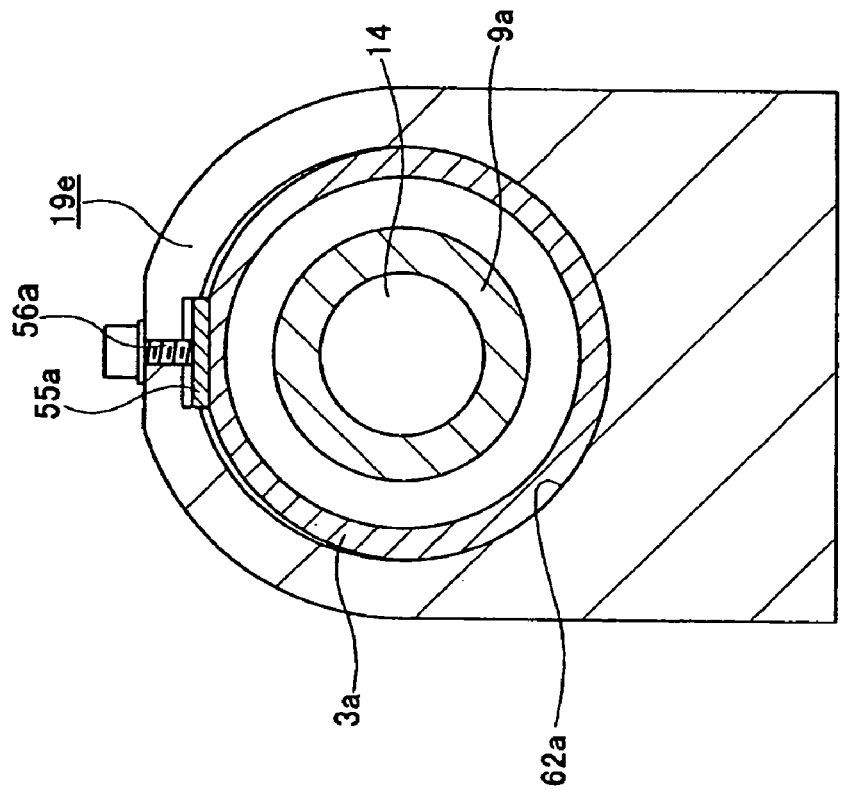
FIG. 21 is enlarged cross-sectional views through D-D of FIG. 20 showing two examples of the structure of a joined part between an inner column and a joining bracket.
Figure 21:
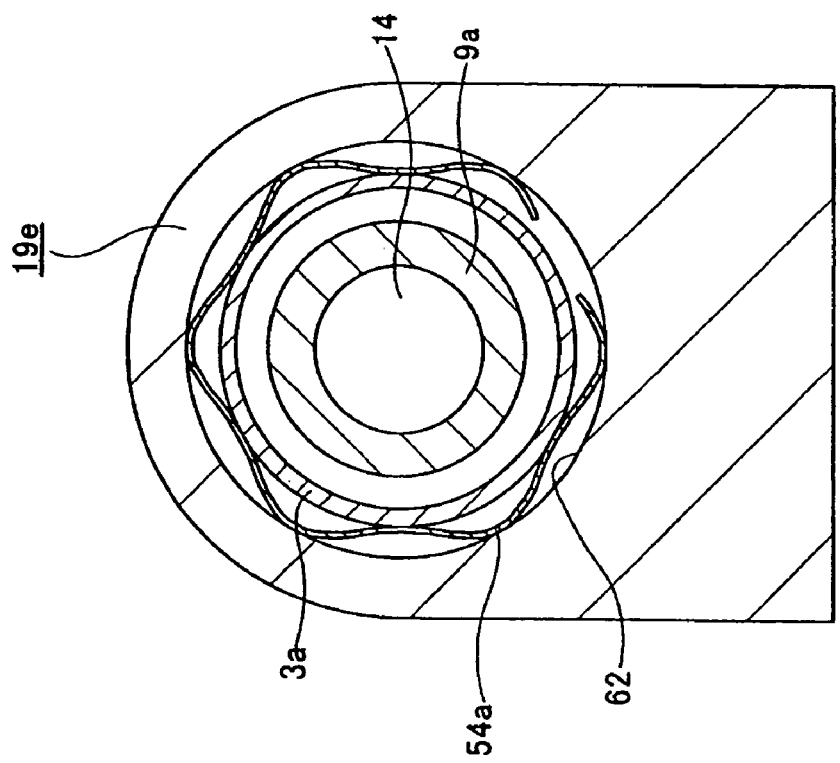
Figure 22:
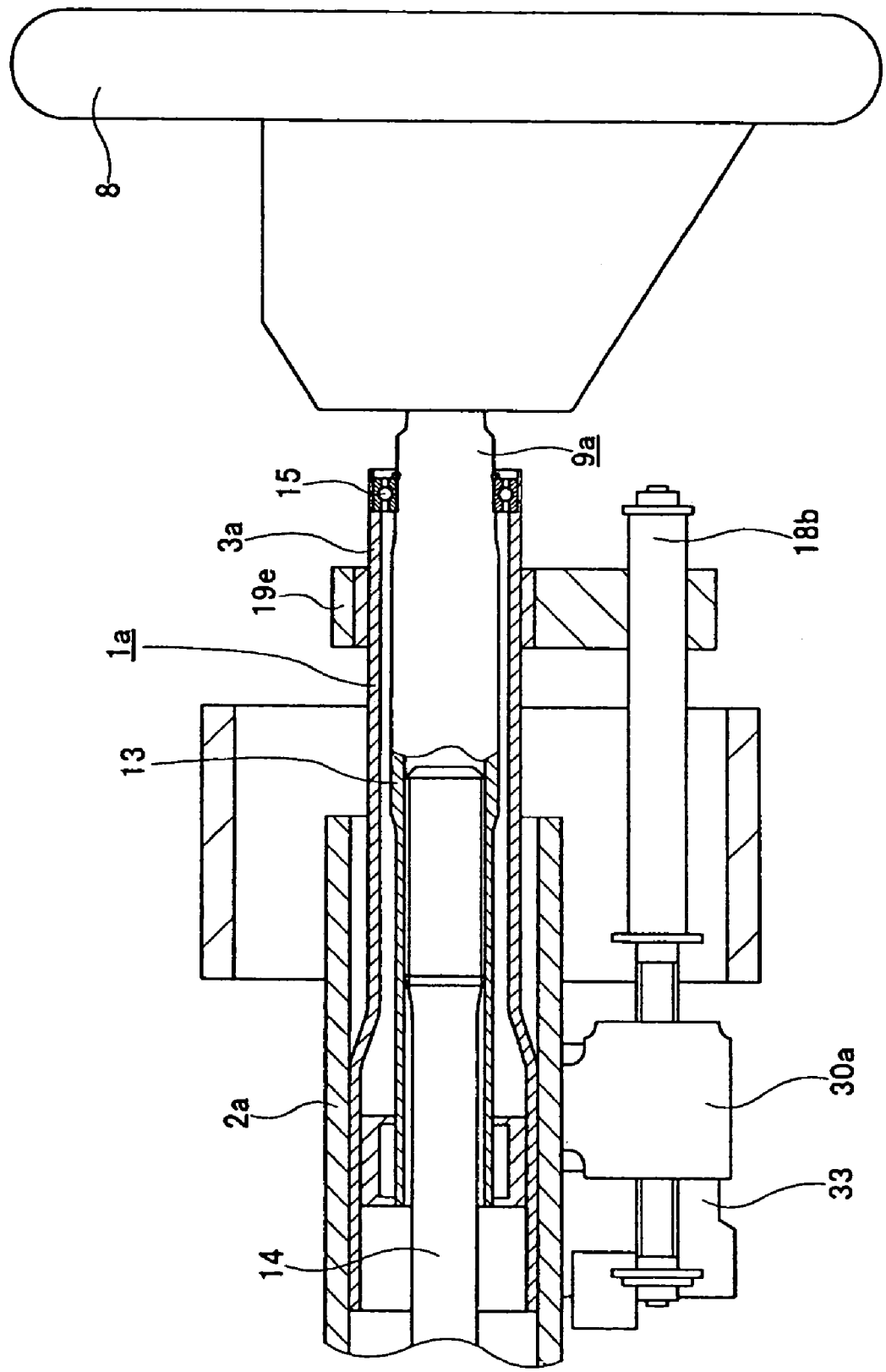
FIG. 22 is a vertical sectional side elevation showing the main parts of example 10 of the present invention in a state in which a secondary collision occurs.

FIGS. 20 to 22 show example 10 of the present invention. In the case of the present example, the arrangement is also such that the volume of the parts that are displaced forward at the time of a secondary collision is minimized. Therefore, in the case of the present example, the construction is such that the joined part between an inner column 3a and a joining bracket 19e, which is fitted and supported on the outside of the inner column 3a, can be separated based on the shock load applied at the time of a collision. The joining bracket 19e and the threaded rod 18b are joined and secured inseparably. In the case of the present example, the joining bracket 19e and the threaded rod 18b correspond to the driven members in relation to the first aspect of the present invention. Whereas, in relation to the second aspect of the present invention, the joining bracket 19e corresponds to the driven member, and the threaded rod 18b corresponds to the push-pull rod. Furthermore, in relation to the both aspects of the present invention, similarly to the case of example 8 shown in FIGS. 15 to 17, a feed nut, being the driving member, is supported in a housing 30a fixed on the outer peripheral surface of the outer column 2a in a state in which it is screwed onto a male thread formed on the proximal end part (left end part in FIGS. 20 and 22) of the threaded rod 18b such that it can only be rotated freely. Then, by rotating the feed nut by the electric motor 33 in a predetermined direction, the threaded rod 18b is displaced in the axial direction (left/right direction in FIGS. 20 and 22), and the inner column 3a is displaced in the axial direction via the joining bracket 19e, so that the fore-aft direction of the steering wheel 8 is adjusted.

In the case of the present example, the construction is such that the joining bracket 19e and the threaded rod 18b are joined inseparably, while the joining bracket 19e is displaced relative to the inner column 3a in the axial direction of the inner column 3a. Therefore, in the case of the present example, the joined part between the joining bracket 19e and the inner column 3a are constructed such that they can be separated based on the shock load applied at the time of a collision, using any one of the constructions shown in FIG. 21.

First, in the construction as shown in FIG. 21(A), the central part of the inner column 3a is inserted loosely in a round through hole 62 formed at the proximal end part of the joining bracket 19e. Moreover a spacer 54a, which can be elastically deformed, is sandwiched between the inner peripheral surface of the through hole 62 and the outer peripheral surface of the central part of the inner column 3a, in a state in which the dimensions related to the radial direction are compressed elastically. The spacer 54a may also be of a type that is formed in a cylindrical shape from a metallic spring, called a tolerance ring, or a material with a large coefficient of friction and internal loss, such as rubber, vinyl, or the like, as shown in the figure, similarly to the spacer 54 (shown in FIG. 16(A)). Whichever is used, a resistance which is sufficiently larger than the force acting when adjusting the fore-aft direction of the steering wheel 8, is applied between the inner and outer peripheral surfaces of the spacer 54a, and the inner peripheral surface of the through hole 62 and the outer peripheral surface of the central part of the inner column 3a. However, this resistance is kept to a level at which it cannot support the shock load applied to the joined part at the time of a secondary collision.

Next, the construction of the second example as shown in FIG. 21(B), a friction plate 55a formed from a material with a large coefficient of friction is pressed to the outer peripheral surface of an inner column 3a inserted in a through hole 62a, by a screw 56a. With regards to the friction force acting between the outer peripheral surface of the inner column 3a, the friction plate 55a, and the inner peripheral surface of the through hole 62a, similarly to the construction shown in FIG. 21(A), it is also sufficiently larger than the force acting when adjusting the fore-aft direction of the steering wheel 8, and is adjusted to a level at which it cannot support the shock load applied to the joined part at the time of a secondary collision.

Whichever construction is used, the inner column 3a and the joining bracket 19e separate based on the shock load applied at the time of a collision, and the inner column 3a is able to be displaced forward. That is, at the time of a secondary collision, the joined part between the inner column 3a and the joining bracket 19e is separated, and as shown FIG. 22, the inner column 3a is displaced forward together with the steering wheel 8, which relieves the impact applied to the body of the driver who collides with the steering wheel 8. Moreover, in the construction shown in FIG. 21(A), if the spacer 54a is formed from a material whose internal loss is large, such as rubber, vinyl or the like, when the feed nut is rotated and driven to displace the threaded rod 18b in the axial direction, it is possible to prevent vibration from the electric motor 33 from being transmitted to the steering wheel via the threaded rod 18*b* and the joining bracket 19*e*. Furthermore, according to the construction shown in FIG. 21(A), even in the case where the center of the through hole 62 and the center of the inner column 3*a* are slightly offset, this can be absorbed. Accordingly, the degree of tolerance of process errors and assembly errors of each of the components is increased, which is an advantage from the aspect of cost reduction.

EXAMPLE 11

Figure 23:
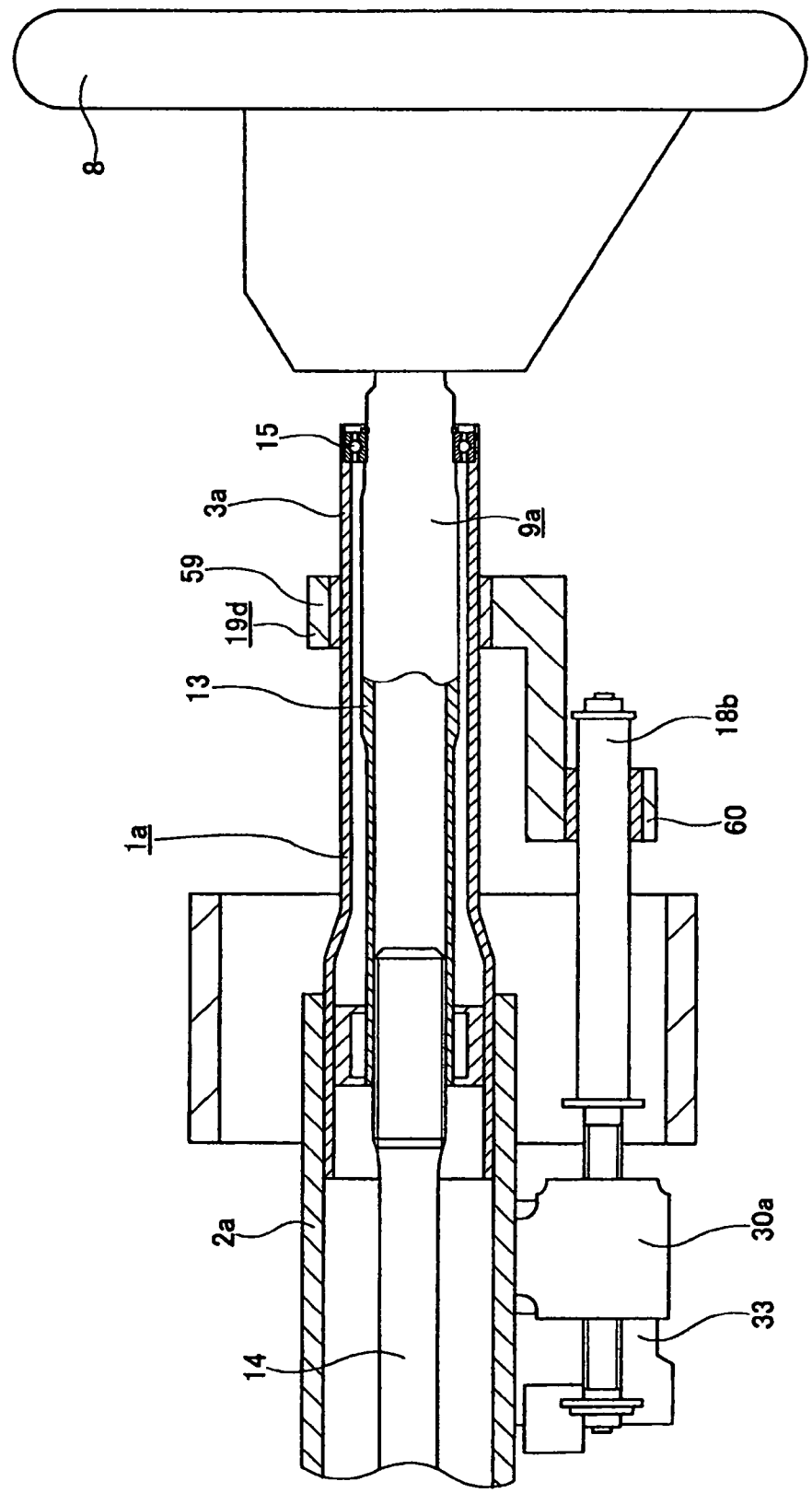
FIG. 23 is a vertical sectional side elevation showing the main parts of example 11 of the present invention in a normal state.
Figure 24:
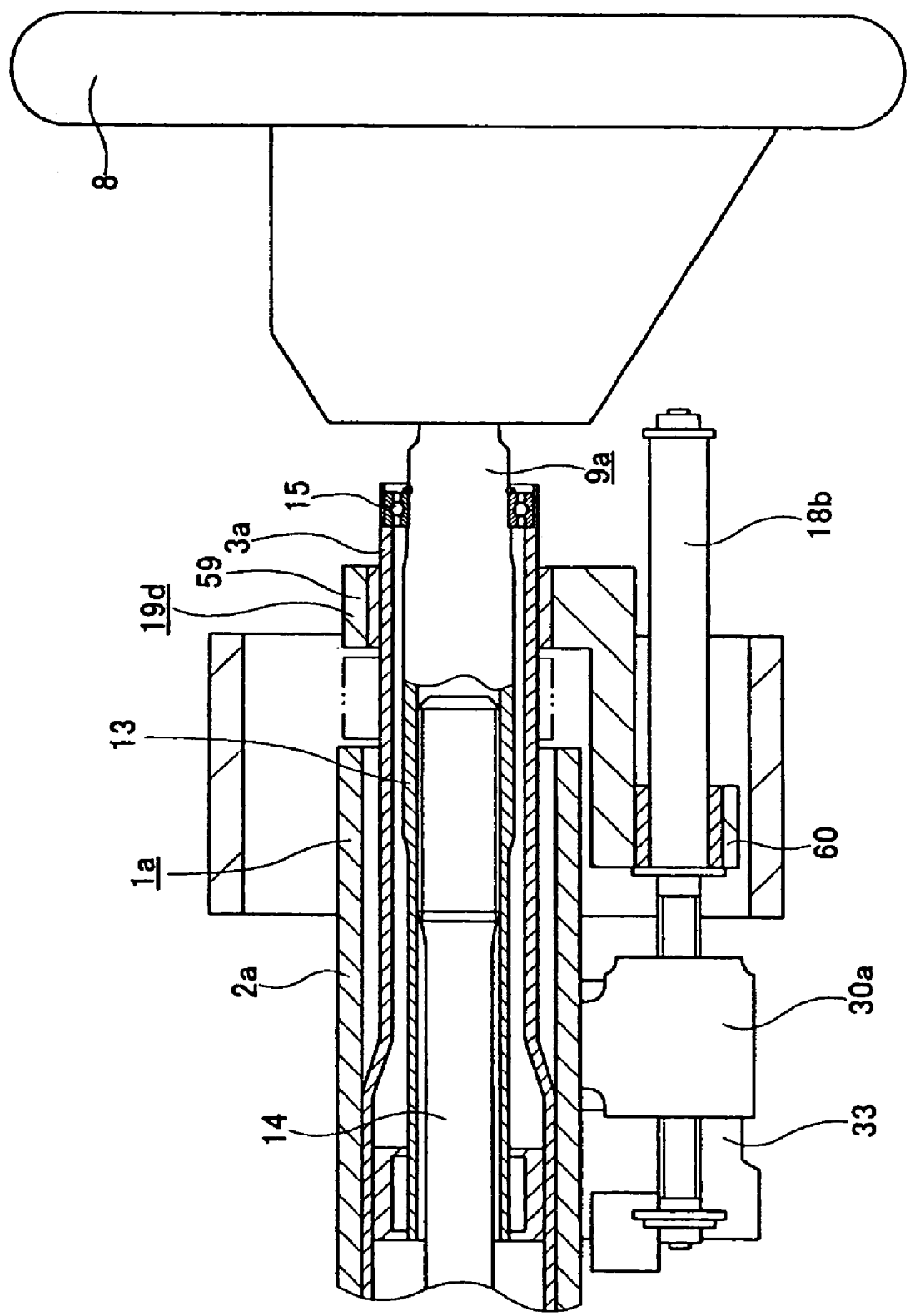
FIG. 24 is a vertical sectional side elevation showing the main parts of example 11 in a state in which a secondary collision occurs.

FIGS. 23 and 24 show example 11 of the present invention. The present example has a construction in which example 9 shown in FIGS. 18 and 19, and example 10 shown in FIGS. 20 to 22, are combined. That is, in the case of the present example, a connecting part 60 provided at the front end part (left end part in FIGS. 23 and 24) of a crank shaped joining bracket 19*d*, and the tip end of a threaded rod 18*b*, are joined such that they can be separated at the time of a secondary collision. Furthermore, a base part 59 provided at the rear end part of the joining bracket 19*d* is joined to the central part of an inner column 3*a* such that it can be separated at the time of a secondary collision. In the case of the present example described above, the effects and benefits obtained in the above-described examples 9 and 10 can be obtained, and in addition, the amount of forward displacement of the steering wheel 8 at the time of a secondary collision is sufficiently increased, thus achieving a further improvement in the protection of a driver.

EXAMPLE 12

Figure 25:
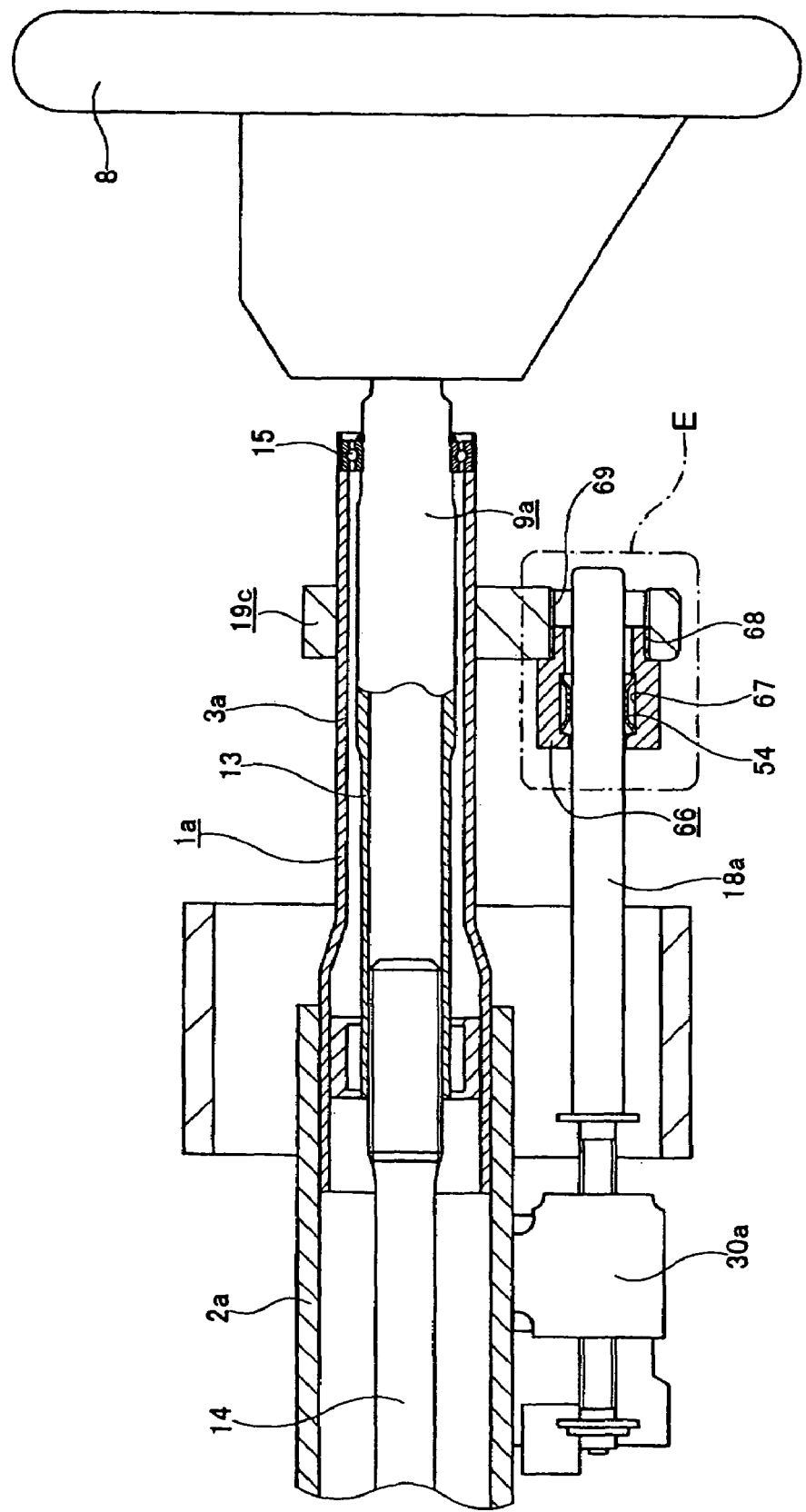
FIG. 25 is a vertical sectional side elevation showing the main parts of example 12 of the present invention in a normal state.
Figure 26:
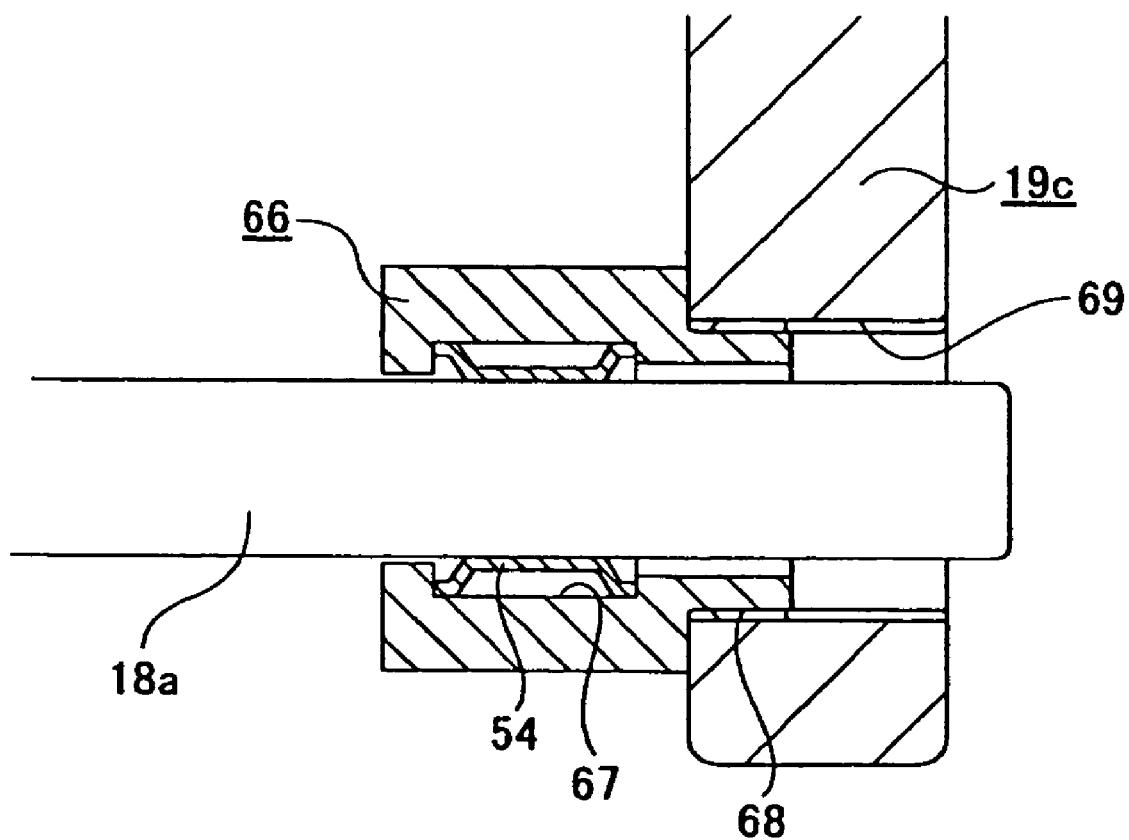
FIG. 26 is an enlarged view of section E of FIG. 25.
Figure 27:
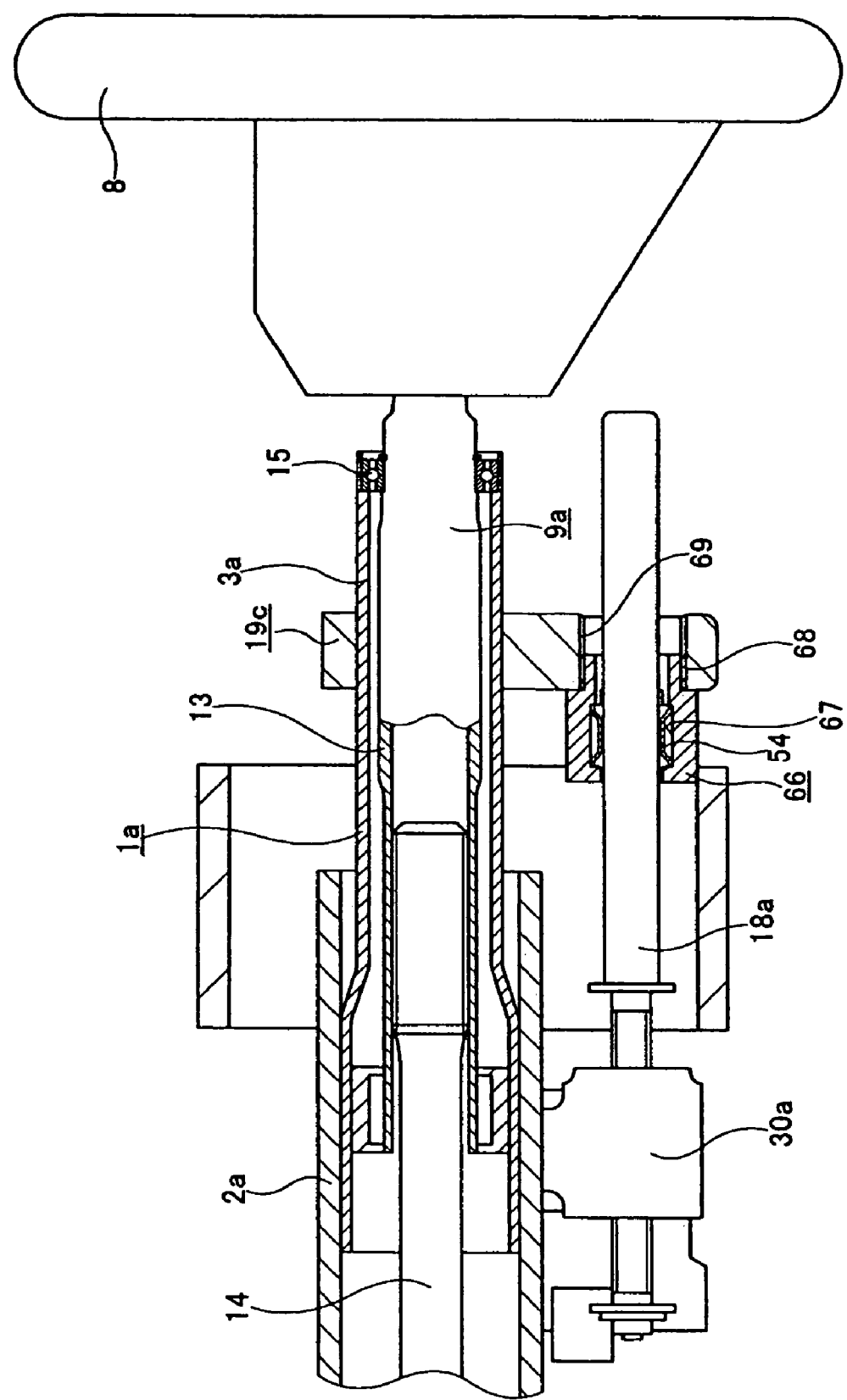
FIG. 27 is a vertical sectional side elevation showing the main parts of example 12 of the preset invention in a state in which a secondary collision occurs.

FIGS. 25 to 27 show example 12 of the present invention. In the case of the present example, a spacer 54 formed from an elastic material as shown in FIG. 16(A) is interposed between the outer peripheral surface of a threaded rod 18*a* corresponding to a push-pull rod, and the inner peripheral surface of a retainer sleeve 66 arranged on the periphery of the threaded rod 18*a*. In the case of the present example, this retainer sleeve 66 is formed into a cylindrical shape by turning a metal raw material such as steel or the like, and a retaining cavity 67 and a male thread 68 are formed around the inner peripheral surface of the central part and the outer peripheral surface of the end part respectively. Furthermore, so that the spacer 54 can be deformed elastically in the radial direction, as shown in FIG. 16(A), it is formed into a corrugated shape with corrugations in the radial direction around the circumference direction. The spacer 54 is sandwiched between the bottom surface (inner peripheral surface) of the retaining cavity 67 and the outer peripheral surface of the part toward the rear end of the central part of the threaded rod 18*a* in a state in which the thickness dimensions in the radial direction are contracted elastically. Moreover, the retainer sleeve 66 is fixed on a joining bracket 19*c* by screwing and securing the male thread 68 into a threaded hole 69 formed in the joining bracket 19*c*. Accordingly, the retainer sleeve 66 is joined to the joining bracket 19*c*, being the driven member, such that it can be displaced forward freely together with the joining bracket 19*c* at the time of a collision accident. Furthermore, the rear end part of the threaded rod 18*a* is inserted loosely into the threaded hole 69.

In example 8, in the case of the construction shown in FIG. 16(A) for example, after the rear end part (right end part in FIG. 15) of the threaded rod 18 is joined with the joining bracket 19*c* via the spacer 54, it is necessary to assemble the front end part (left end part in FIG. 15) of the threaded rod 18*b* onto the housing 30*a*. Whereas, in the case of the present example, it is possible to assemble the spacer 54 and the retainer sleeve 66 onto the threaded rod 18*a* in advance as a subassembly. Therefore, the operation of assembling onto the housing 30*a* can be performed prior to the operation of joining (connecting) with the joining bracket 19*c*. The operation of joining the retainer sleeve 66 with the joining bracket 19*c* can be performed easily in a state in which the front end part (left end part in FIG. 25) of the threaded rod 18*a* is assembled onto the housing 30*a*. Since the efficiency of the assembly operation can be improved in this manner, it can be the that the constructions shown in FIGS. 25 to 27 are beneficial from the aspect of cost reduction.

At the time of a secondary collision, when the threaded rod 18*a* is slid inside the spacer 54, as shown in FIG. 27, the steering wheel 8 is able to be displaced forward. At this time, by the friction of the outer peripheral surface of the threaded rod 18*a* and the inner peripheral surface of the spacer 54, the impact energy applied to the inner column 3*a* from the steering wheel 8 is absorbed, which is intended to protect a driver who collides with the steering wheel 8. Since the spacer 54 is retained in the retaining cavity 67 without backlash (assembled into the retaining cavity 67 in a state in which the axial direction dimensions are contracted compared with the free state), the position is stable. Accordingly, when the steering wheel 8 moves forward, there is no disturbance to the position of the spacer 54 based on the friction with the threaded rod 18*a*, and hence no excessive friction, so that the load required for the forward displacement of the steering wheel 8 is not large.

Figure 28:
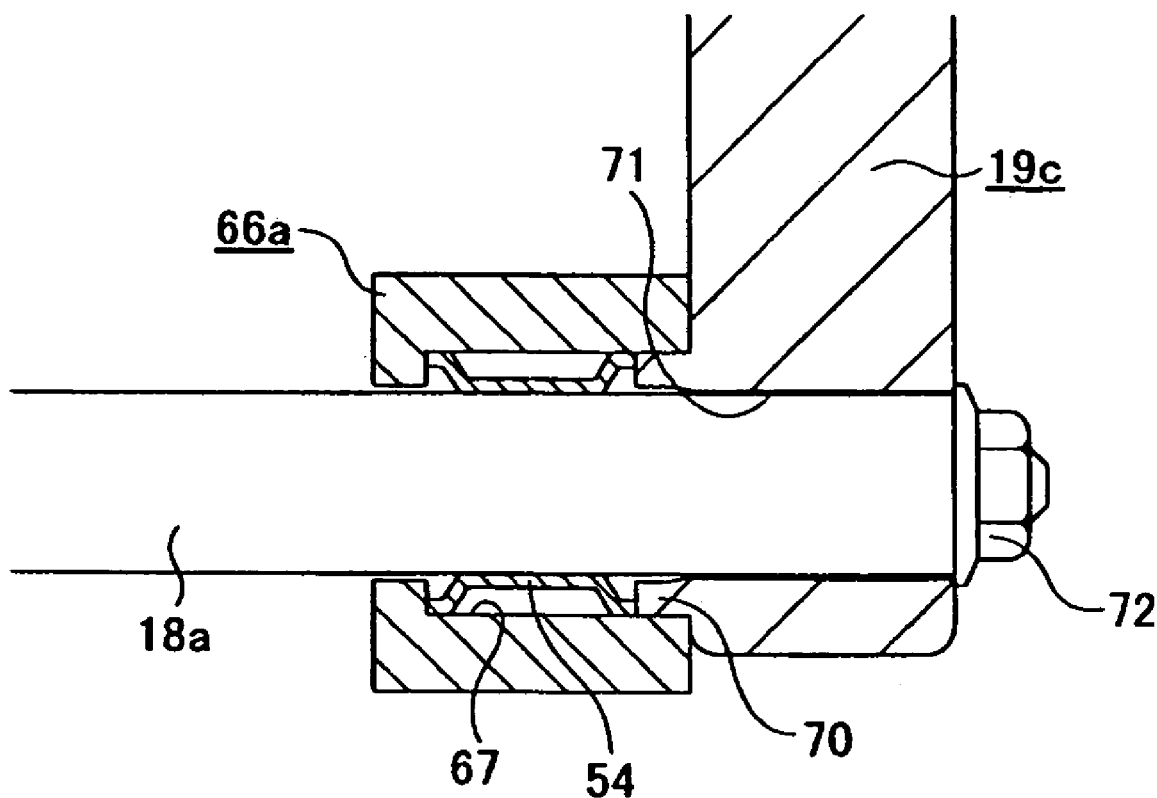
FIG. 28 is a view similar to FIG. 26 showing another example of a structure of a joined part between a threaded rod and a joining bracket.

In addition, as a modified example of the present example, as shown in FIG. 28, by externally fitting the rear end part of a retainer sleeve 66*a* with interference fit onto a support sleeve part 70 formed on the front surface of the bottom end part of a joining bracket 19*c*, it is also possible to secure the retainer sleeve 66*a* to the joining bracket 19*c*. The spacer 54 is contracted between the tip surface of the support sleeve part 70 and the inner surface of the retainer sleeve 66*a* in the axial direction. Furthermore, the rear end part of the threaded rod 18*a* is inserted loosely into a through hole 71 formed in the part surrounded by the support sleeve part 70 at the bottom end of the joining bracket 19*c*. A nut 72 with a collar is screwed onto the rear end part of the threaded rod 18*a*, which prevents the threaded rod 18*a* from exiting forward from the through hole 71.

EXAMPLE 13

Figure 29:
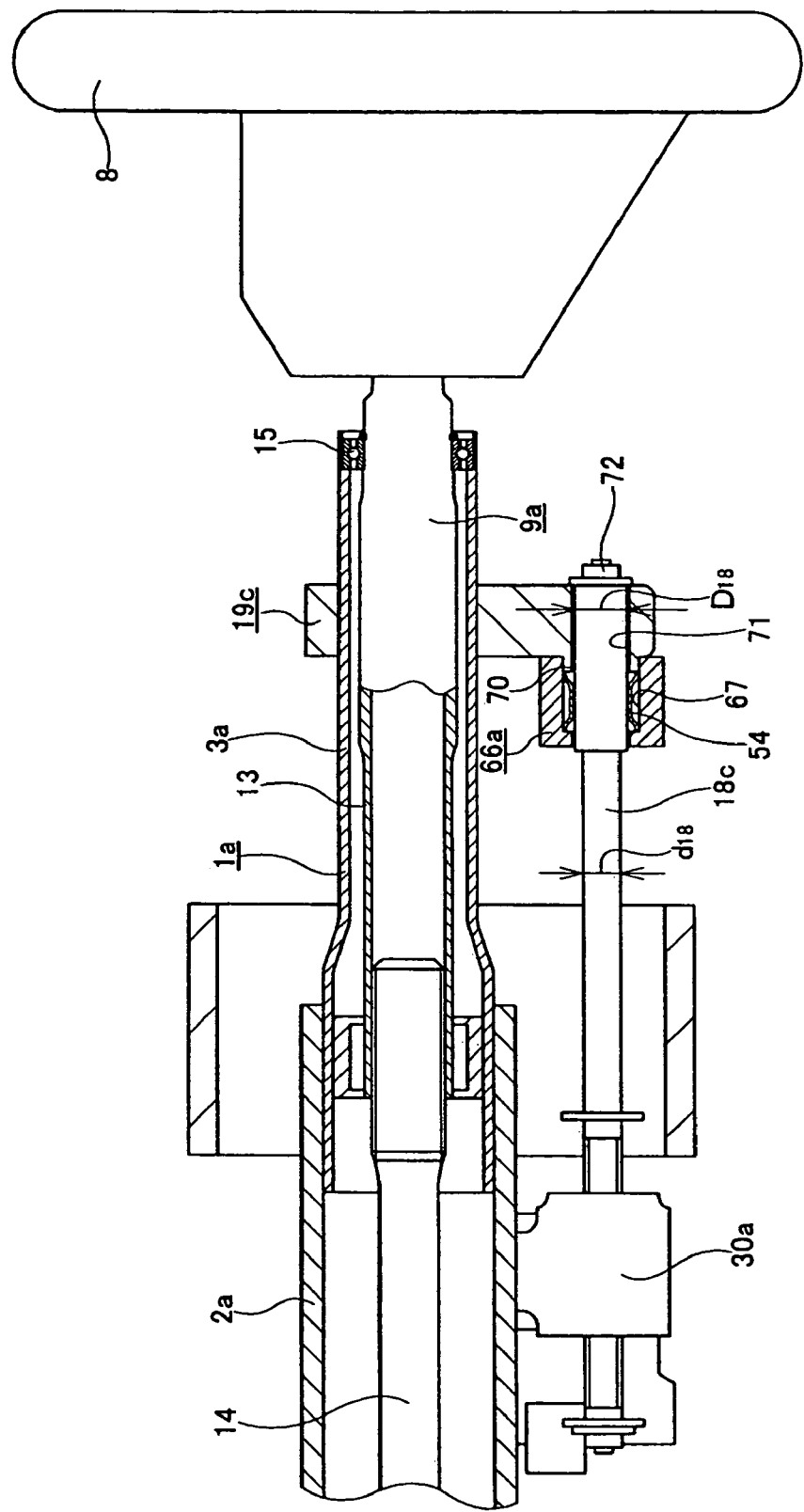
FIG. 29 is a vertical sectional side elevation showing the main parts of example 13 of the present invention in a normal state.
Figure 31:
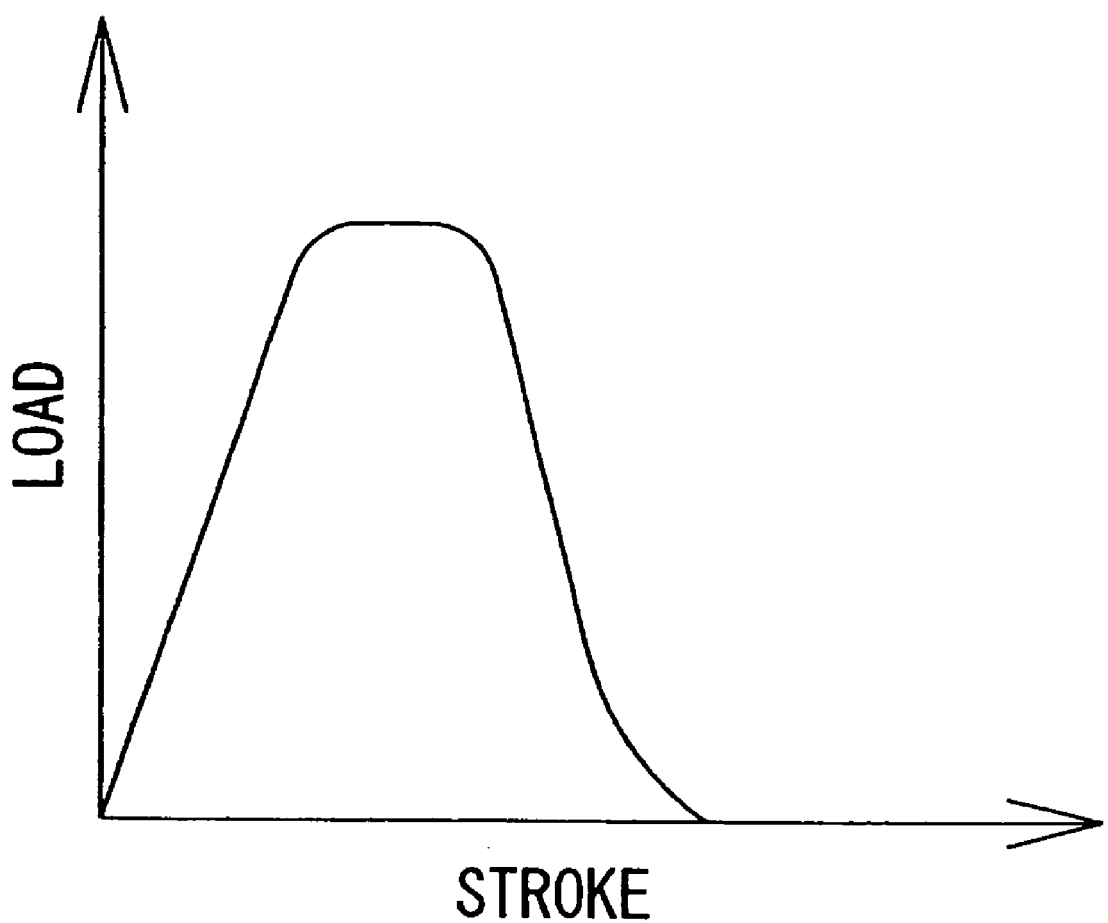
FIG. 31 is a line chart showing the relationship between the amount of displacement of a steering wheel and the magnitude of the impact energy (load) absorbed by the joined part between a threaded rod and a joining bracket.

FIGS. 29 and 31 show example 13 of the present invention. In the case of the present example, the outer diameter $D_{18}$ of the part of a threaded rod 18*c*, being the push-pull rod, that is positioned on the inner diameter side of the spacer 54 at a normal time (at the time that no secondary collision has occurred) is made larger than the outer diameter $d_{18}$ of the part of the same that enters the inner diameter side of the spacer 54 as a collision accident occurs. In other words, the outer diameter of the threaded rod 18*c* is large at the part toward the rear end, and small at the central part toward the front end part.

Figure 30:
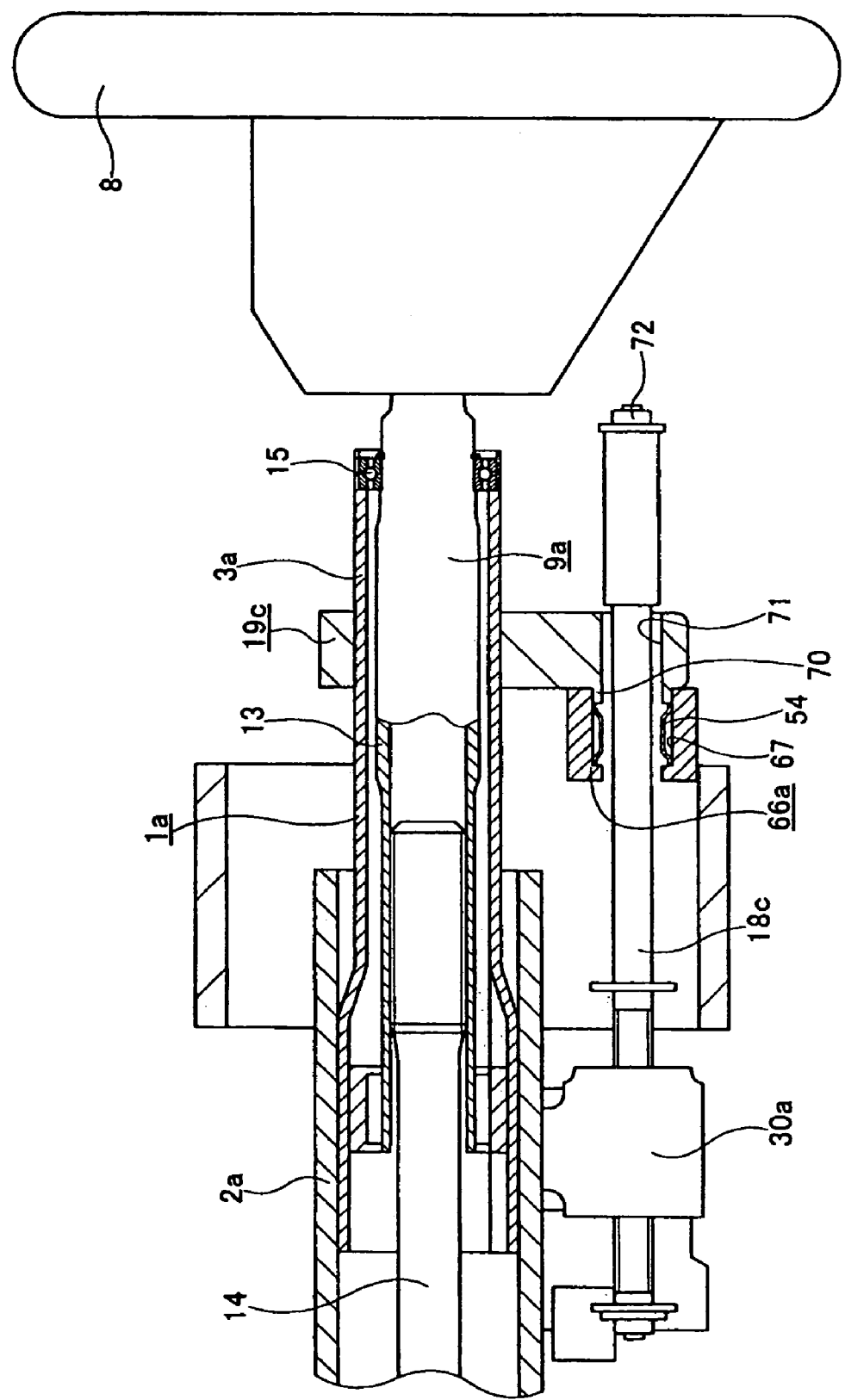
FIG. 30 is a vertical sectional side elevation showing the main parts of example 13 in a state in which a secondary collision occurs.

In the case of the present example, since the outer diameter of the threaded rod 18*c* is large at the part toward the rear end as described above, the energy absorption characteristics at the time of a secondary collision can be adjusted. That is, there is a part toward the rear end of the threaded rod 18*c*, whose outer diameter $D_{18}$ is large, on the inner diameter side of the spacer 54 at a normal time as shown in FIG. 29. In this state, a comparatively large friction force acts between the outer peripheral surface of the threaded rod 18*c* and the inner peripheral surface of the spacer 54. Whereas, at the time of a secondary collision, as shown in FIG. 30, the threaded rod 18*c* is displaced in the axial direction with respect to the spacer 54 while rubbing against it as the steering wheel 8 is displaced forward. At this time, the impact energy applied to the steering wheel is absorbed by the friction force.

When the steering wheel 8 is displaced forward by a certain extent, as shown in FIG. 30, a part of the threaded rod 18c, whose outer diameter $d_{18}$ is small, is located on the internal diameter side of the spacer 54, and the contact pressure between the outer peripheral surface of the threaded rod 18c and the inner peripheral surface of the spacer 54 is reduced or is eliminated. In this state, the ability to absorb the impact energy is reduced or eliminated at the part where the two peripheral surfaces engage. In other words, the resistance against the forward displacement of the steering wheel 8 is reduced or is lost. As a result, according to the construction of the present example, at the time of a secondary collision, the energy that is absorbed by the part where the spacer 54 and the threaded rod 18c engage changes as the steering wheel 8 is displaced forward as shown in FIG. 31. As is evident from FIG. 31, according to the construction of the present example, since the stroke that displaces the steering wheel 8 forward can be adjusted while absorbing the impact energy, the degree of freedom of tuning to protect the driver is improved. The constructions and operations of the other parts are the same as in example 12 described previously.

EXAMPLE 14

Figure 32:
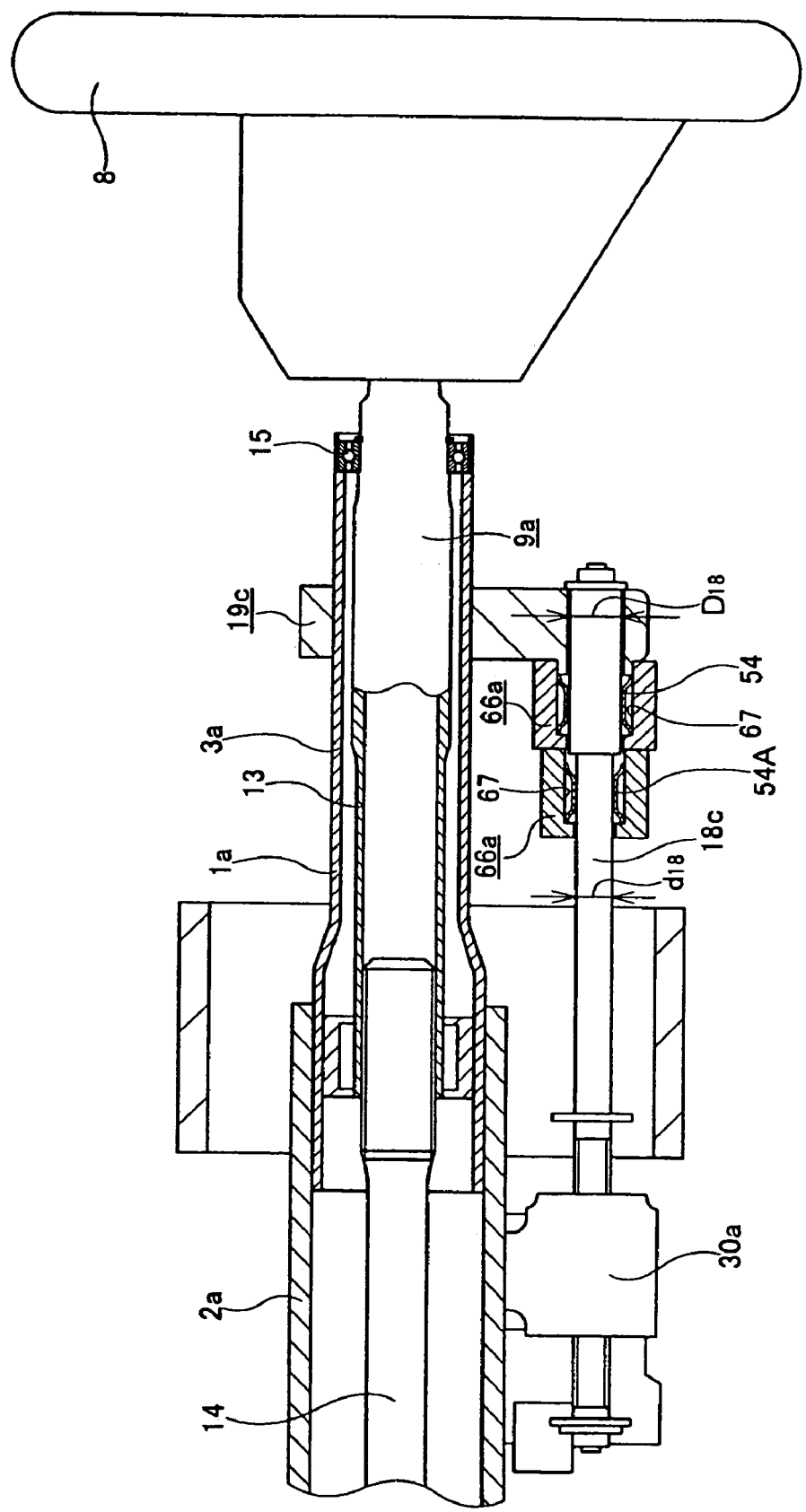
FIG. 32 is a vertical sectional side elevation showing the main parts of example 14 of the present invention in a normal state.
Figure 33:
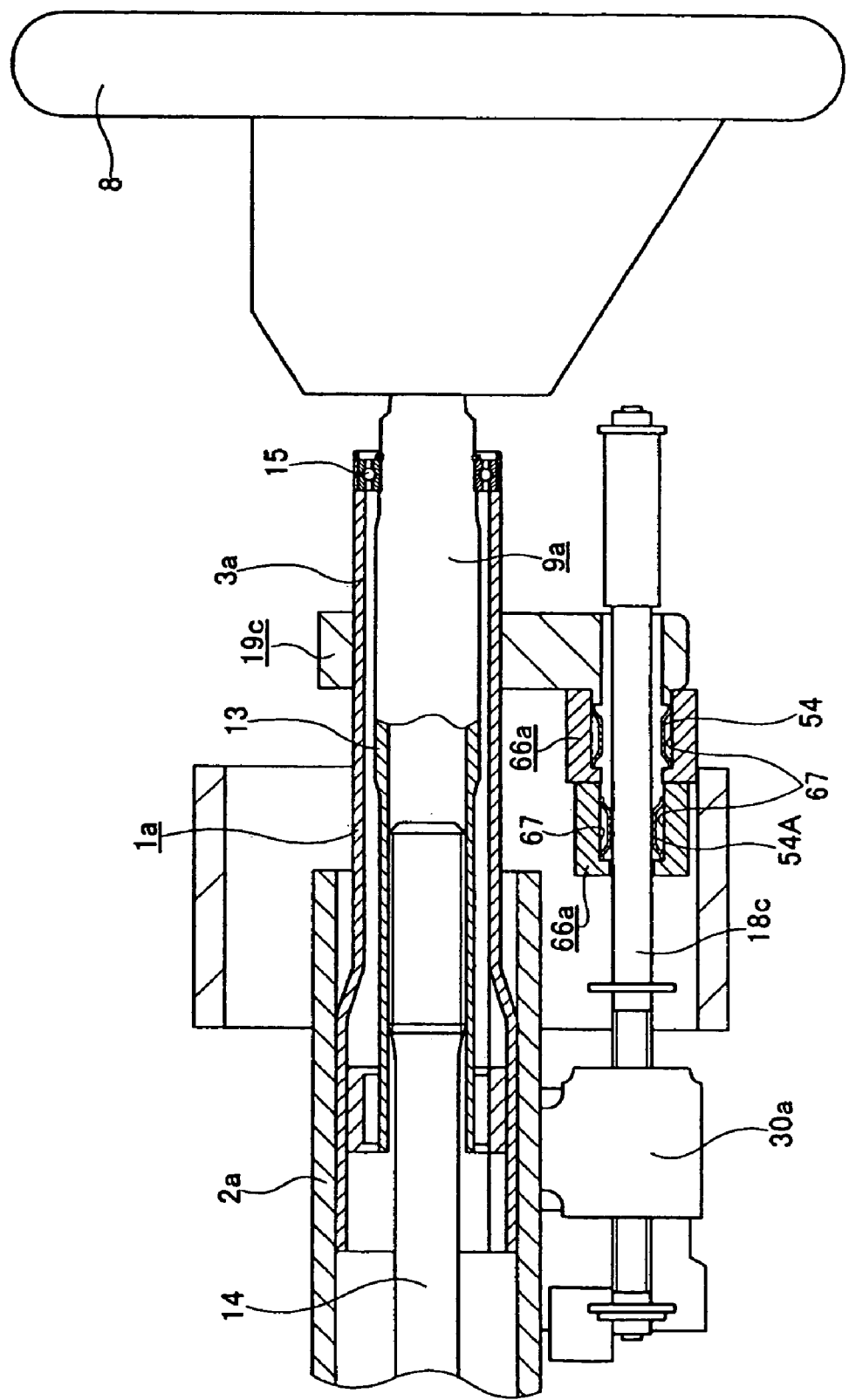
FIG. 33 is a vertical sectional side elevation showing the main parts of example 14 in a state in which a secondary collision occurs.
Figure 34:
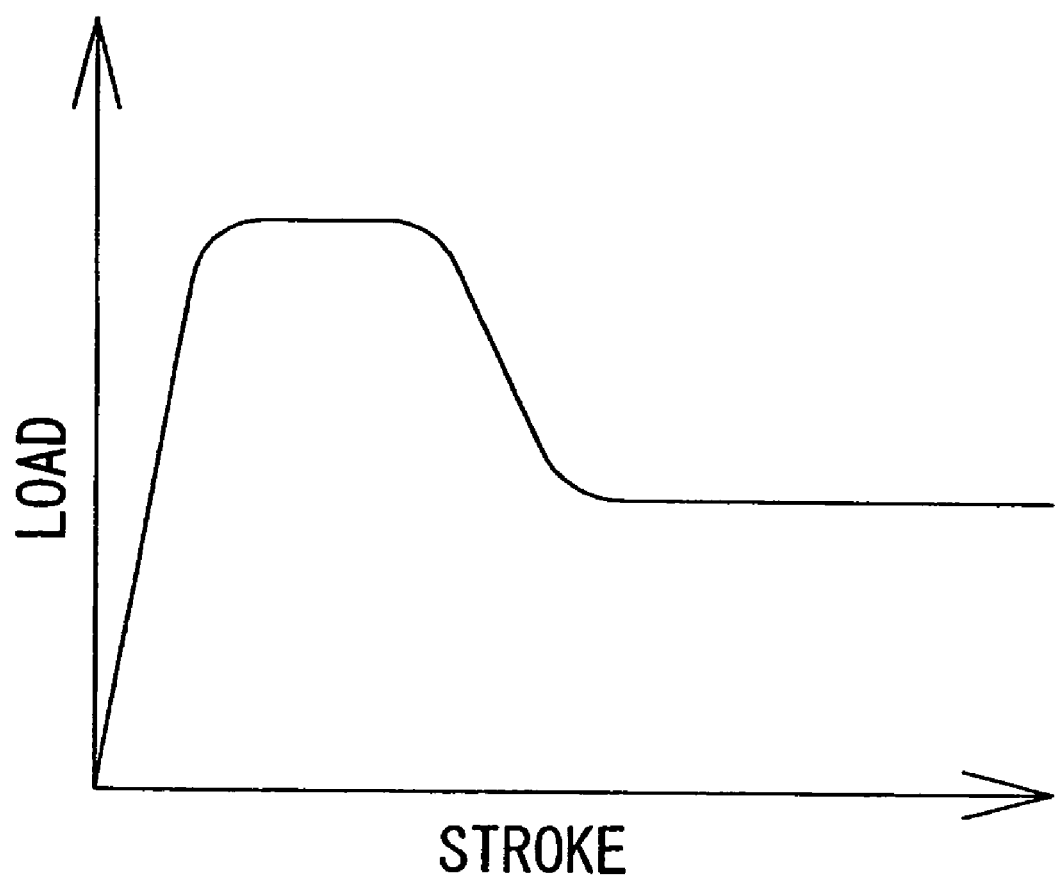
FIG. 34 is a line chart showing the relationship between the amount of displacement of a steering wheel and the magnitude of the impact energy (load) absorbed by the joined part between a threaded rod and a joining bracket.

FIGS. 32 to 34 show example 14 of the present invention. In the case of the present example, two spacers 54 and 54A, whose inner diameters are different in a free state, are provided at two positions in the axial direction on the periphery of the threaded rod 18c, being the push-pull rod. Moreover, the part of the threaded rod 18c whose outer diameter $D_{18}$ is large is located inside of the spacer 54 whose inner diameter is large in a free state, and the part of the same whose outer diameter $d_{18}$ is small is located inside of the spacer 54A whose inner diameter is small in the same state. The part whose outer diameter $d_{18}$ is small makes contact elastically (friction engagement) with the inner peripheral surface of the spacer 54A whose inner diameter is small, but does not make contact elastically with the inner peripheral surface of the spacer 54 whose inner diameter is large.

In the case of the present example, as described above, since the two kinds of spacers 54 and 54A whose inner diameters are different, are located in series relative to the displacement direction of the threaded rod 18c, and joined with the threaded rod 18c having different outer diameters $D_{18}$ and $d_{18}$, it is possible to adjust the energy absorption characteristics at the time of a secondary collision more finely. That is, in a state in which the steering wheel 8 is displaced forward at the time of a secondary collision as shown in FIG. 33, energy is not absorbed at the inner peripheral surface part of the spacer 54 whose inner diameter is large, but energy absorption is continuous at the inner peripheral surface part of the spacer 54A whose inner diameter is small. Therefore, at the time of a secondary collision, the energy that is absorbed at the part where the spacers 54 and 54A and the threaded rod 18 are engaged changes as shown in FIG. 34 as the steering wheel 8 is displaced forward. As is evident from FIG. 34, according to the present example, the energy absorption amount and stroke can be adjusted in two stages, and hence the degree of freedom of tuning to protect the driver is further improved. Here, the case of the present example only shows a construction in which two spacers 54 and 54A are provided at two positions in the axial direction on the periphery of the threaded rod 18c, being the push-pull rod. However, the number of spacers is not limited to two. That is, any construction may be used provided it can adjust the energy absorption amount and stroke at the time of a secondary collision in a plurality of stages, and hence it is also possible to provide a plurality of (for example three) spacers at a plurality of positions in the axial direction on the periphery of the threaded rod, being the push-pull rod. Furthermore, in this case, it is also possible to alter the outer diameter of the threaded rod, being the push-pull rod, at a plurality of positions.

The invention claimed is:

1. A motor-driven position adjustment apparatus for a steering wheel comprising: a steering column with a steering shaft rotatably supported inside; a driven member joined to a part of the steering column; a push-pull rod which is arranged in the axial direction of the steering column in a state where one end is joined to the driven member; a driving member that is rotatably supported on the periphery of a part toward the other end of the push-pull rod, and that displaces the push-pull rod in the axial direction of the steering column as it rotates; and an electric motor for rotating and driving the driving member, and the steering column being displaced based on a relative displacement of the driving member and the push-pull rod based on a current supplied to the electric motor to adjust a position of a steering wheel supported on an end of the steering shaft, wherein at least either one of a joined part between the push-pull rod and the driven member, and a joined part between the driven member and the steering column, can be separated based on a shock load applied at the time of a collision, and wherein the separable joined part includes a pair of members to be joined, which are fitted via an elastic deformable spacer.

2. A motor-driven position adjustment apparatus for a steering wheel according to claim 1, wherein the spacer has a high coefficient of friction.

3. A motor-driven position adjustment apparatus for a steering wheel according to claim 1, wherein a spacer is interposed between an outer peripheral surface of the push-pull rod, and an inner peripheral surface of a retainer sleeve arranged on the periphery of the push-pull rod, and the retainer sleeve is joined to a driven member such that it can be displaced freely together with the driven member at the time of a collision.

4. A motor-driven position adjustment apparatus for a steering wheel according to claim 1, wherein an outer diameter of a part of the push-pull rod that is positioned on an inner diameter side of the spacer at a normal time, is made larger than an outer diameter of a part of the same that enters the inner diameter side of the spacer when a collision occurs.

5. A motor-driven position adjustment apparatus for a steering wheel according to claim 4, wherein the push-pull rod has a first part and a second part of smaller outer diameter than the first part, two spacers whose inner diameters are different in a free state are provided at two positions in the axial direction on the periphery of the push-pull rod, and at normal times, the first part of the push-pull rod is located inside of the spacer whose inner diameter is larger in the free state, and the second part of the push-pull rod is located inside of the spacer whose inner diameter is small in the free state.

6. A motor-driven position adjustment apparatus for a steering wheel according to claim 1, wherein the separable joined part is constructed by joining a pair of members to be joined, using a joining member that breaks based on a shock load.

7. A motor-driven position adjustment apparatus for a steering wheel according to claim 1, wherein the spacer comprises a metallic spring.

8. A motor-driven position adjustment apparatus for a steering wheel according to claim 1, wherein the spacer comprises a non-metallic elastic material.

* * * * *